(12) United States Patent
van den Nieuwelaar et al.

(10) Patent No.: US 6,997,797 B1
(45) Date of Patent: Feb. 14, 2006

(54) DEVICE FOR PROCESSING SLAUGHTERED ANIMALS OR PARTS THEREOF

(76) Inventors: Adrianus J. van den Nieuwelaar, Den Hoek 33, 5421 XG Gemert, Gemert (NL); Jan W. Bos, Beerseweg 25, 5443 NL Haps, Haps (NL)

( * ) Notice: Subject to any disclaimer, the term of this patent is extended or adjusted under 35 U.S.C. 154(b) by 0 days.

(21) Appl. No.: 09/705,971

(22) Filed: Nov. 3, 2000

(30) Foreign Application Priority Data

| Nov. 5, 1999 | (NL) | .................................. 1013502 |
| Dec. 28, 1999 | (NL) | .................................. 1013974 |

(51) Int. Cl.
*A22C 21/00* (2006.01)

(52) U.S. Cl. ...................... 452/182; 452/177; 452/179; 452/180

(58) Field of Classification Search ........ 452/177–184, 452/53, 54, 106
See application file for complete search history.

(56) References Cited

U.S. PATENT DOCUMENTS

| 3,643,293 | A | | 2/1972 | Rejsa et al. | |
| 4,178,659 | A | * | 12/1979 | Simonds | 452/182 |
| 4,574,428 | A | * | 3/1986 | Meyn | 452/182 |
| 4,597,133 | A | * | 7/1986 | van der Nieuwelaar | 452/182 |
| 4,627,007 | A | | 12/1986 | Muschany | |
| 4,813,101 | A | * | 3/1989 | Brakels et al. | 452/182 |
| 5,318,428 | A | * | 6/1994 | Meyn | 452/106 |
| 5,344,360 | A | * | 9/1994 | Hazenbroek | 452/182 |
| 5,453,045 | A | * | 9/1995 | Hobbel et al. | 452/182 |
| 5,569,067 | A | * | 10/1996 | Meyn | 452/106 |
| 5,672,098 | A | * | 9/1997 | Veraart | 452/182 |
| 6,033,299 | A | * | 3/2000 | Stone et al. | 452/182 |
| 6,254,472 | B1 | * | 7/2001 | Meyn | 452/188 |
| 2002/0058470 | A1 | * | 5/2002 | Schmidt et al. | 452/182 |

FOREIGN PATENT DOCUMENTS

| AU | EP 0235106 A1 * | 2/1986 |
| AU | EP 0225306 A2 * | 6/1987 |
| DE | 2557877 | 7/1977 |
| EP | 0244888 A1 | 11/1987 |
| EP | 0259920 A1 | 3/1988 |
| EP | 0319114 A1 | 6/1989 |
| EP | 0819382 A1 | 1/1998 |
| FR | 1408850 | 7/1965 |
| GB | 1484099 | 8/1977 |
| NL | 7412044 | 9/1974 |
| NL | EP 0357843 A1 * | 3/1990 |

* cited by examiner

*Primary Examiner*—Peter M. Poon
*Assistant Examiner*—David J. Parsley
(74) *Attorney, Agent, or Firm*—Kilpatrick Stockton LLP; Kristin J. Doyle

(57) ABSTRACT

A device for processing slaughtered animals or parts thereof, having a first station and a second station, comprises a conveyor which extends between the first station and the second station. The conveyor comprises at least one slot which is designed to carry and support the slaughtered animals, a supply device for supplying the slaughtered animals or parts thereof at the first station on the conveyor, and a discharge device for discharging the slaughtered animals or parts thereof from the conveyor at the second station. The device has at least one driven driving member which spans at least half of the width of the slot, passes through a path which is substantially parallel to the course of the slot and is designed to move the slaughtered animals or parts thereof which are in the slot along the slot.

60 Claims, 13 Drawing Sheets

DEVICE FOR PROCESSING SLAUGHTERED ANIMALS OR PARTS THEREOF

FIELD OF THE INVENTION

This invention relates to a device for processing slaughtered animals or parts thereof, having a first station and a second station, comprising a conveyor which extends between the first station and the second station and which comprises at least one slot with a width and a course, which at least one slot is designed to support the slaughtered animals or parts thereof in a bearing manner, supply means for supplying the slaughtered animals or parts thereof at the first station to the conveyor, discharge means for discharging the slaughtered animals or parts thereof from the conveyor at the second station, and at least one driven driving member which passes through a path which is substantially parallel to the course of the at least one slot and is designed to move the slaughtered animals or parts thereof which are situated in the at least one slot along the at least one slot from the first station towards the second station, along the at least one slot.

DISCUSSION OF THE PRIOR ART

A device for processing slaughtered animals is known from Dutch Patent Application No. 7,412,044. This publication describes a device for transferring slaughtered poultry which is moved, hanging by its legs in a conveyor hook, along a first conveyor track towards a conveyor hook which is moved along a second conveyor track. In the known device, a guide for the conveyor hook is arranged along a section of the first conveyor track and along a section of the second conveyor track, a transfer guide for the legs of the poultry being provided between the said sections of the conveyor tracks. A first end of the transfer guide opens out in the vicinity of the first conveyor track, in such a manner that the poultry can move out of the conveyor hook into the transfer guide. At a second end of the transfer guide, there is an ejector which is actuated by a piston device which presses the poultry being moved along in the transfer guide into a conveyor hook which is present along the second conveyor track.

The transfer guide comprises two parallel rod-like elements which are situated at a short distance from one another. Roller-mounted, driven conveyor belts are arranged along the rod-like elements, which belts are able to convey the poultry hanging between the rod-like elements from the first end to the second end along the transfer guide.

A drawback of the known device is that the device is unsuitable for the temporary storage and selective transfer of the poultry in the transfer guide.

Another drawback is that the use of an ejector in combination with a piston device for removing the poultry from the transfer guide means that the device acts discontinuously and slowly.

Another drawback is that it is uncertain that the poultry will be carried along with the known device, on account of the frictional contact between the conveyor belts and the poultry, there being a considerable risk, likewise on account of the frictional contact between the conveyor belts and the poultry, of the poultry being damaged while it is being moved in the transfer guide.

Another device is known from European Patent Application No. 259,920. This publication describes a device for selectively transferring slaughtered animals, in particular poultry, which are supplied on a first conveyor track and hang by their legs in conveyor hooks, to at least one discharge station along a second conveyor track. As its conveyor means, the known device has a substantially annular, closed path which extends between the first conveyor track and the discharge station, which is connected to the second conveyor track. Transfer hooks which are mounted on the annular path by means of rollers, are provided with recesses and are driven by a drive ring, can be moved along the annular path. The drive ring is coupled to the transfer hooks by means of a frictional connection. In a receiving position of the conveyor means, a conveyor hook of the first conveyor track is located opposite a transfer hook of the conveyor means, so that a slaughtered animal hanging from the conveyor hook can be selectively transferred from the first conveyor track to the transfer hook of the conveyor means. In a release position of the conveyor means, a transfer hook with a slaughtered animal hanging from it is located in the discharge station for releasing the slaughtered animal hanging from the transfer hook to the second conveyor track. The known device can provide limited temporary storage for the slaughtered animals hanging from the transfer hooks, one slaughtered animal per transfer hook, before releasing the slaughtered animals to the second conveyor path.

A drawback of the device which is known from European Patent Application No. 259,920 is its complex structure, making production costs high and requiring considerable assembly work. The complex structure of the device makes it difficult to clean. A further drawback is that the known device has a limited temporary storage capacity.

A further drawback of the device is that while a slaughtered animal is being taken from the first conveyor track by a transfer hook of the conveyor means, the movement of the transfer hook has to be synchronized with the movement of the conveyor hook in which the slaughtered animal to be transferred is situated. A similar drawback presents itself when the slaughtered animal is being discharged to the second conveyor track.

Another device is known from Dutch Patent No. 1,004, 408. This publication describes a device for selectively picking up slaughtered animals, in particular poultry, at a first station and selectively discharging these slaughtered animals at a second station. The known device has a moveable, endless conveyor means in the form of a rotatably disc or ring and along the path of which the first and second stations are located. The conveyor means is provided with a number of slits which run substantially in the radial direction and in which two or more slaughtered animals or parts thereof can be supported in a bearing manner. The known device comprises supply means, by which slaughtered animals can be selectively supplied to the slits in the conveyor means, and discharge means, which, also selectively, are able to remove the slaughtered animals from the slits.

A drawback of the device which is known from Dutch Patent No. 1,004,408 is the complicated control of both the supply means and the discharge means and the associated complex structural design of the supply and discharge means and the corresponding control members.

Furthermore, from French Patent Application No. 1,408, 850 a device is known for transferring product carriers which travel or slide along a first conveyor track, via a connecting conveyor track, to a second conveyor track. The product carriers are removed from the first conveyor track with the aid of a switching mechanism. The product carriers are moved along the connecting conveyor track by means of arms which are mounted on a rotatably driven disc, are spring-mounted and describe a circular path which is in part parallel to a section of the course of the connecting conveyor track. Along the connecting conveyor track, the arms bear against the product carriers and, in doing so, exert a force on the product carriers which makes the product carriers advance along the connecting conveyor track.

A drawback of the device which is known from French Patent Application No. 1,408,850 is that it is not possible for the products which are conveyed by the product carriers, to be transferred from the first conveyor track to the second conveyor track separately from the product carriers.

A second drawback is that the product carriers to be transferred cannot be temporarily stored and cannot be controllably discharged to the second conveyor track, making the device unsuitable for the selective processing of slaughtered animals or parts thereof.

SUMMARY OF THE INVENTION

An object of the invention is to provide a device of the above-mentioned type which at least partially overcomes the abovementioned drawbacks.

To achieve the above-mentioned object, the invention is characterized in that the at least one driving member spans at least half the width of the at least one slot.

At the said first and second station, the slaughtered animals or parts thereof can be supplied to and discharged from the device, for example from or to a conveyor track located along the device, by either mechanical or manual means.

Advantageously, the at least one driving member can adopt a first position and a second position, in which the slaughtered animals or parts thereof are and are not, respectively, moved from the first station towards the second station. In the second position of the at least one driving member, the latter will be able to move past the slaughtered animals or parts thereof situated in the at least one slot scarcely without damaging the slaughtered animals or parts thereof.

Preferably, the at least one driving member can rotate about an axis which is substantially perpendicular to the path covered by the at least one driving member, so that it is easy to carry out a movement from the first position towards the second position and vice versa.

In a preferred embodiment of the device according to the invention, the at least one driving member comprises at least one arm which is designed to transmit the movement of the at least one driving member to the slaughtered animals or parts thereof, so that a simple structure of great durability is obtained.

Preferably, the at least one driving member is provided with force means which oppose a movement of the at least one driving member from the first position towards the second position, specifically in such a manner that the movement from the first position towards the second position takes place in a controlled way. This prevents or at least limits damage to the slaughtered animals or parts thereof and makes it easy to adjust the force under which the at least one driving member is pressed against the slaughtered animals or parts thereof situated in the at least one slot of the conveyor. In addition, a structure is obtained which is easy and inexpensive to produce. In a preferred embodiment, the force means comprise separate spring means, such as compression springs, tension springs or torsion springs, although the force means may also be formed by the at least one driving member itself being flexible and resilient.

The force means advantageously comprise a controllable piston-cylinder device, so that it is possible to actively adjust the position of the at least one driving member.

In a preferred embodiment of the device according to the invention, the piston-cylinder device can make the at least one driving member adopt any desired position between the first position and the second position, so that it is possible to set the most favourable position of the at least one driving member with respect to the slaughtered animals or parts thereof which are to be transported.

If the piston-cylinder device is of the pneumatic type, the at least one driving member is also provided with a resilient effect which is dependent on the pressure prevailing in the piston-cylinder device.

Incidentally, the advantages described above are also achieved with driving members which do not span at least half the width of the slot but are formed, for example, by the driven conveyor belts as described in Dutch Patent Application No. 7,412,044.

In a preferred embodiment of the invention, either the supply means are designed to selectively supply the slaughtered animals or parts thereof to the at least one slot and/or the discharge means are designed to selectively discharge the slaughtered animals or parts thereof from the at least one slot. As a result, the device can be used to selectively transfer the slaughtered animals from the first station to the second station.

In an advantageous embodiment of the device according to the invention, the supply means comprise a switching mechanism. The switching mechanism may be put into a first switched position, in which the slaughtered animals or parts thereof are supplied to the at least one slot of the conveyor, and into a second switched position, in which the slaughtered animals or parts thereof are not supplied to the at least one slot of the conveyor. If it is assumed that the device interacts with a conveyor in which slaughtered animals or parts thereof are conveyed at or on carrying means past the first station, the slaughtered animals or parts thereof can be selectively supplied to the at least one slot of the conveyor. To this end, the switching mechanism preferably comprises a switching plate which, in a first position, guides the slaughtered animals or parts thereof towards the at least one slot of the conveyor. In this way, it is possible for the structure and action of the switching mechanism to be of simple design.

In a preferred embodiment of a device according to the invention, supply-control means and/or discharge-control means are provided, which control the supply and discharge means, respectively, the control being effected on the basis of data relating to the slaughtered animals or parts thereof to be transferred, such as size, weight, contours, colour, abnormalities and the like. Providing the device with supply-control means enables the slaughtered animals to be transferred selectively from a conveyor to the device according to the invention on the basis of the said information relating to the slaughtered animals, such as size, weight, contours, colour, abnormalities and the like, so that the slaughtered animals or parts thereof can be selectively transferred from the first station to the second. Providing the device according to the invention with discharge-control means enables the slaughtered animals to be discharged selectively in a corresponding way.

Advantageously, the supply means and/or the discharge means comprise at least one rotatably driven disc which on its circumference is provided with at least one holding slot, which opens out on the outer circumference of the at least one rotatably driven disc and is designed to carry and support in it at least one slaughtered animal or a part thereof. A disc of this nature is easy and inexpensive to produce and can be cleaned successfully. The slaughtered animals or parts thereof can be moved one by one out of the at least one slot in the conveyor into a holding slot in the at least one disc by the at least one rotatably driven disc and, from this holding slot, can be placed into a part of the slot in which the slaughtered animals or parts thereof can be temporarily stored.

Preferably the at least one rotatably driven disc has at least two holding slots, so that when a slaughtered animal is moved from an occupied holding slot into a part of the slot, the other holding slot is already available for holding a slaughtered animal from the at least one slot of the conveyor, so that it is possible to achieve a high speed of transfer of the slaughtered animals. If it is assumed that the device interacts with a conveyor on which the slaughtered animals or parts thereof can be released at the second station, the slaughtered animals or parts thereof may, for example, be selectively supplied to the at least one slot at the first station or may be selectively discharged from the at least one slot at the second station, or both.

In a further preferred embodiment, the at least one slot of the conveyor extends substantially in a horizontal plane, so that the slaughtered animals or parts thereof cannot move undesirably within this slot under the influence of the force of gravity.

It is preferable for the at least one slot of the device according to the invention to have a substantially curved course. This enables a support of the driving members to be designed simply so as to rotate about an axis. In addition, if the device interacts with a conveyor track at the first and/or second station, the at least one slot will be able to tangentially adjoin the conveyor track by means of a suitably curved course in the vicinity of the first and/or second station, so that it is very easy to supply or discharge the slaughtered animals or parts thereof to or from the at least one slot.

In another advantageous embodiment of a device according to the invention, the at least one slot has a substantially straight course. As a result, it is easy, although not necessary, to use a plurality of slots at even conveying distances, for example if, as is customary, the slaughtered animals are conveyed hanging by their legs in the product carriers or the parts of the slaughtered animals are conveyed in pairs in the product carriers, in which case the use of a double slot is desirable and is therefore easy to realize.

In a further advantageous embodiment, an unloading device is provided inside the slot, which device is preferably designed to locally widen the at least one slot. This makes it possible to remove the slaughtered animals or parts thereof from the slot between the first station and the second station while they are being transferred.

In a preferred embodiment of the device according to the invention, the unloading device comprises a support member which defines a section of the at least one slot and can move substantially transversely with respect to the direction of the slot, in order to locally increase the width of the slot, so that at that location the width of the at least one slot can be increased in such a manner that the slaughtered animals or parts thereof are no longer supported and will fall out of the at least one slot.

The device according to the invention preferably comprises unloading-control means for controlling the unloading device, for example on the basis of previously recorded data.

In another preferred embodiment of the device according to the invention, a weighing device is incorporated in the at least one slot for weighing the slaughtered animals or parts thereof. This makes it possible to determine the weight of the slaughtered animals or parts thereof which are situated in the at least one slot, on the basis of which it is possible to select further processing operations to be carried out on the slaughtered animals or parts thereof.

In another preferred embodiment of the device according to the invention, the unloading-control means record the weight of the slaughtered animals or parts thereof which has been detected by the weighing device and control the unloading device on the basis of this data, for example its support member, so that it becomes possible to selectively remove the slaughtered animals or parts thereof from the at least one slot between the first station and the second station.

In an advantageous embodiment of the device according to the invention a processing device is provided along the course of the at least one slot, for processing the slaughtered animals or parts thereof. The advantage which ensues is that the slaughtered animals or parts thereof are already undergoing a processing step while they are being conveyed in the at least one slot, so that it is possible to dispense with a processing station of this type further on in the line. This saves space. In this way, it is also possible to make good use of the time which the slaughtered animals or parts thereof spend in the slot, in particular if they are temporarily stored therein, for a processing step to be carried out, so that time is saved in an overall processing sequence.

In a preferred embodiment of the device according to the invention, the processing device comprises at least one frictional surface which is arranged along the at least one slot and is designed to act on part of the slaughtered animals or parts thereof. This enables the slaughtered animals or parts thereof, in particular the legs, to rotate at the location of the processing device, with the result that the slaughtered animals or parts thereof animals, in particular the legs, can, for example, be marinated with ease. It is preferable for the frictional surface to form part of a driven conveyor belt, a section of which extends along at least a section of the slot.

In a further preferred embodiment, the processing device comprises two driven conveyor belts which are arranged on either side of the at least one slot, for clamping a part of the slaughtered animals or parts thereof between them, with the result that they can be handled particularly well.

In another preferred embodiment, the processing device comprises at least two driven conveyor belts which are arranged one behind the other along the at least one slot. Preferably, the direction and/or speed of movement of a first conveyor belt differs from that of a second conveyor belt, so that there is considerable freedom available for moving the slaughtered animals or parts thereof into a desired position with respect to one another (for example at a distance from one another along the slot) and into a desired position for themselves.

The processing device described above can be used not only as a component of the device according to the invention but also on its own.

These and other aspects, characteristics and advantages of the present invention will be explained in more detail with reference to the following description of preferred embodiments of a device according to the invention with reference to the drawing, in which identical reference numerals denote identical or similar components.

BRIEF DESCRIPTION OF THE DRAWINGS

FIG. 13b diagrammatically shows a plan view of the device shown in FIG. 13a.

DESCRIPTION OF THE PREFERRED EMBODIMENTS

Figure 1:
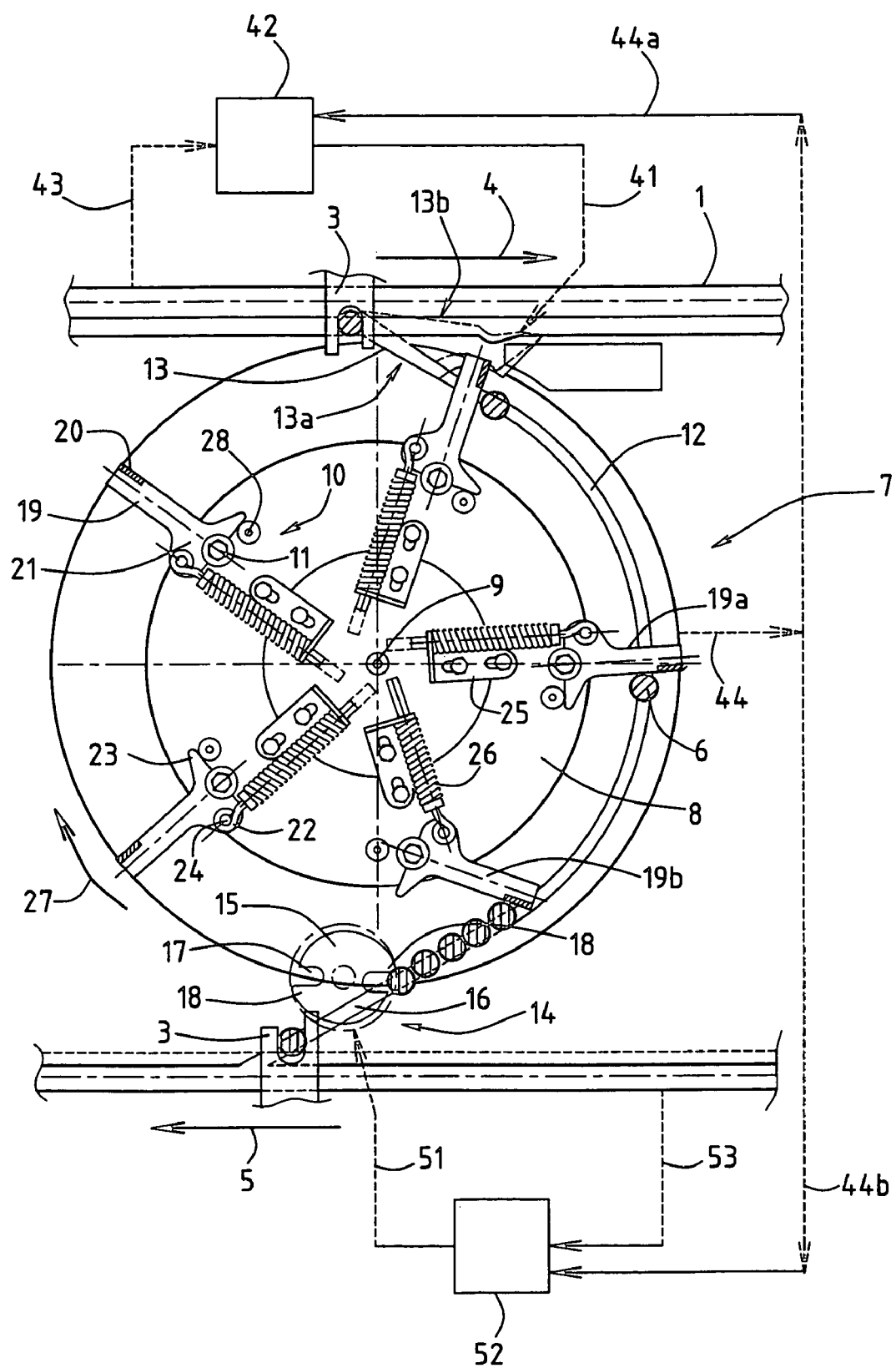
FIG. 1 diagrammatically shows a view from below of a device according to the invention.

FIG. 1 diagrammatically shows a first conveyor 1 and a second conveyor 2, along which product carriers 3 are advanced in a direction indicated by arrow 4 and arrow 5. Slaughtered animals or parts thereof, in particular legs 6 of poultry, are situated in the product carriers 3. The legs 6 can be selectively transferred from the first conveyor 1 to the second conveyor 2 with the aid of the conveyor device, which is denoted overall by reference numeral 7.

The conveyor device 7 comprises a support 8 in the form of a disc, which is mounted in a frame (not shown) in such a manner that it can rotate about an axis 9. On the support 8 there is a number of driving members 10 which are pivotably connected to the support 8 by means of a pivot 11.

A stationary, substantially curved slot 12, which is designed to carry and support the legs 6, extends along the outer circumference of the support 8. The legs 6 may be supplied to the slot 12 via a supply end thereof and can be discharged therefrom via a discharge end of the slot.

At the supply end, the conveyor device 7 comprises a switching mechanism with a substantially triangular switching plate 13. The switching plate 13 is pivotably connected to a frame (not shown). The switching plate 13 can adopt various positions, namely a first position 13a, which is indicated by a solid line, and a second position 13b, which is indicated by a dashed line.

At the discharge end, the conveyor device 7 comprises a discharge means 14. The discharge means 14 comprises a rotatably driven disc 15 and a stationary waiting slot 16, in which the legs 6 can be temporarily stored. On its outer circumference, the disc 15 is provided with two holding slots 17 which are located diametrically opposite one another and are designed to carry and support one leg 6 each, and on its outer circumference, next to the holding slot 17, the disc has two diametrically opposite projections 18.

The driving members 10 comprise an arm 19 having a first, free end 20 and a second, substantially T-shaped end 21. At the T-shaped end 21, the arm 19 is pivotably coupled to the support 8 via the pivot 11. The T-shaped end 21 comprises two projections 22, 23 which run substantially transversely with respect to the arm 19. The projection 22 is coupled, via a pivot 24, to a compression spring 26 which is fixedly connected to the support 8 by a connection means 25. On the support 8, there is a projection 28 which functions as a stop for the projection 23.

The conveyor device 7 comprises supply-control means 42 for controlling the position of the switching plate 13 and discharge-control means 52 for controlling the angular position of the rotatably driven disc 15.

Upstream of the switching plate 13, data relating to the slaughtered animals or parts 6 thereof, such as size, weight, contours, colour, abnormalities and the like, are detected in the first conveyor 1 using suitable measuring means (not shown in more detail), which data is fed to and optionally stored in the supply-control means 42. This is symbolically indicated by dashed line 43. On the basis of the data detected, the position of the switching mechanism with switching plate 13 is controlled by the supply-control means 42, as symbolically indicated by dashed line 41, as a result of this data being compared with predetermined criteria, in order that the slaughtered animals or parts 6 thereof can be optionally transferred from the first conveyor 1 into the slot 12. When a selected slaughtered animal or part 6 thereof reaches the first station, the switching mechanism, in particular the switching plate 13, is activated in such a manner by the supply-control means 42 that it adopts the position 13b and guides the selected animal or part 6 thereof out of the product carrier into the slot 12.

In addition to data 43, it is also possible for data 44 detected using suitable measuring means (not shown in more detail), such as the type, number, position, order or the like, or, for example, a signal from a slot-full detector (not shown in more detail) relating to the slaughtered animals or parts 6 thereof situated in the slot 12, to be fed to the supply-control means. This is symbolically indicated by dashed line 44a.

The driving members 10 arranged on the support 8 rotate in a direction which is symbolically denoted by arrow 27. In the process, the driving members 10, the arms 19 in particular, move substantially parallel to the path of the slot 12, just below the latter, and as they move they take a slaughtered animal or part 6 thereof with them from the first station towards the second station along the slot 12.

The compression spring 26 connected to the projection 22 exerts a restoring force on the arm 19, tending to turn the arm 19 in the direction indicated by arrow 27. The arm 19 can execute a pivoting movement about the pivot 11, counter to the restoring force of the compression spring 26, the arm 19 being able to adopt a position 19b in which the arm 19 does not move the legs 6 along the slot 12. For example, if a plurality of legs 6 have collected in the slot 12 at the discharge end, the arm 19 pivots in a direction which is opposite to the direction of rotation of the support 8, so that the driving members 10, in particular the arms 19, are able to move past the legs 6 which have collected at the discharge end. This prevents the slaughtered animals or parts 6 thereof which have collected in the vicinity of the discharge end being damaged.

After the arms 19 have moved past the legs 6 which have collected at the discharge end, the compression spring 26 will turn the arms 19 until the projection 23 is resting against a stop 28. By designing the arms 19 to pivot in the above way, it is possible for the support 8, if desired, to rotate continuously, with the result that legs 6 are picked up at the supply end of the slot 12 independently of the release of the legs 6 at the discharge end. Moreover, by making the arms 19 pivotable in the manner described above, it is possible to provide temporary storage for a plurality of legs 6 in the slot 12.

The slaughtered animals or parts 6 thereof situated in the slot 12 are pressed into an available holding slot 17 in the rotatably driven disc 15 by the driving members 10, the holding slot 17 being able to hold precisely one slaughtered animal or part 6 thereof.

At the discharge end of the slot 12, discharge-control means 52 control the rotatably driven disc 15, which is designed for discharging the legs 6 from the slot 12 to the waiting slot 16. The control of the rotatably driven disc 15 is symbolically indicated by dashed line 51 and takes place on the basis of data relating to unoccupied product supports 3, which are advanced in conveyor 2, which information is fed to the discharge-control means 52 and has been detected along the conveyor 2 upstream of the discharge slot 16, all this being diagrammatically indicated by dashed line 53. This control may be supplemented by control on the basis of the data relating to the legs 6 situated in the slot 12, such as the type, number, position, order and the like, as symbolically indicated by dashed line 44*b*.

When a designated unoccupied product carrier 3 reaches the second station along the conveyor device 7, the discharge-control means 52 actuate the rotatably driven disc 15 in such a manner that the slaughtered animal or part 6 thereof situated in a holding slot 17 is transferred to the stationary waiting slot 16, after which the slaughtered animal or part 6 thereof is picked up by a product carrier 3 which is just moving past.

Figure 2:
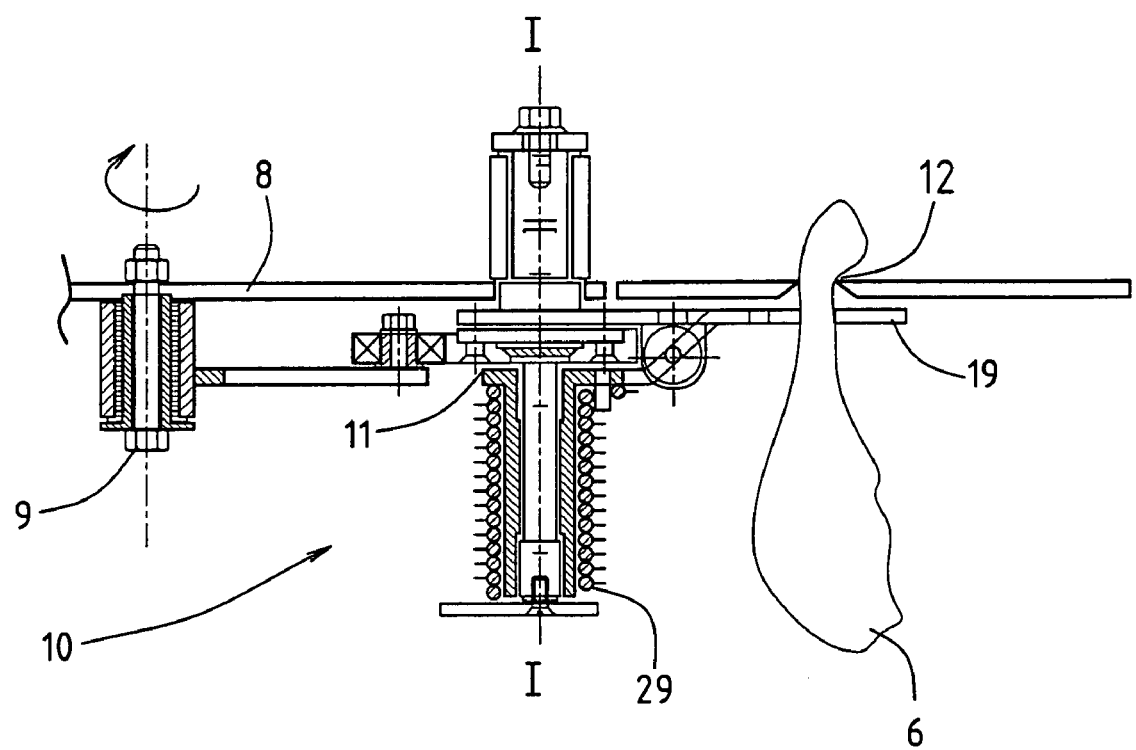
FIG. 2 shows a cross section through a first alternative embodiment of a driving member of a device according to the invention.

FIG. 2 shows a conveyor device according to the invention in which torsion springs 29 are used instead of the compression springs 26 shown in FIG. 1. The torsion springs 29 extend substantially in the longitudinal direction of an axis of rotation, which is symbolically indicated by I—I. The torsion springs 29 are arranged on the support 8, which can rotate about the axis 9. The way in which the conveyor device according to the invention operates does not change compared to the embodiment shown in FIG. 1.

In the preferred embodiments of a conveyor device according to the invention shown in FIGS. 1 and 2, the slot 12 extends substantially in a horizontal plane and also has a course which runs substantially in the form of part of a circle. However, it is also conceivable for the slot 12 to have a substantially straight course or any arbitary course, in which case the driving members are moved in such a manner that they follow a corresponding path.

It is also possible for the slot 12 to extend in a plane which is not horizontal, making it possible for the slaughtered animals or parts thereof to be transferred from a first conveyor to a second conveyor which is at a different height.

Figure 3:
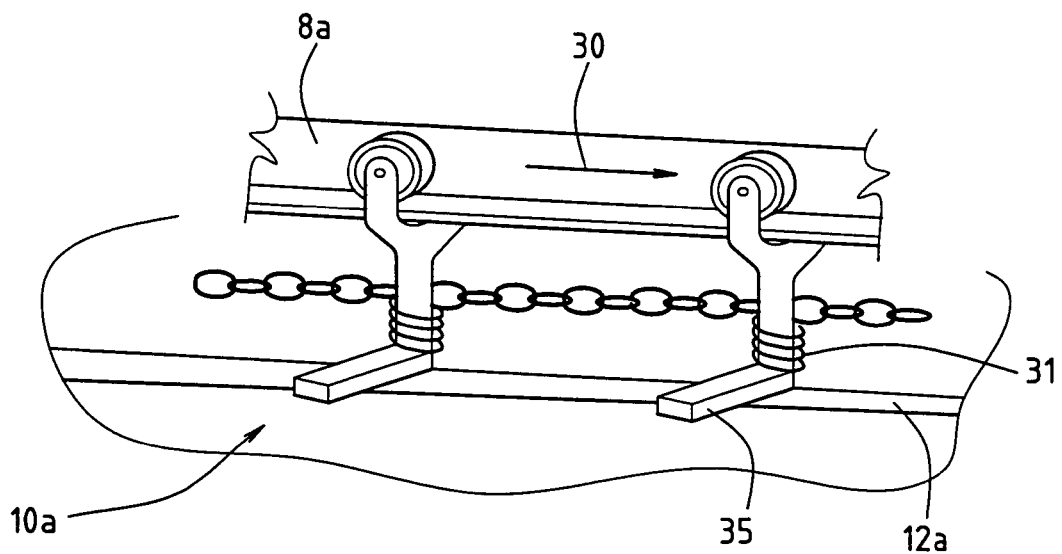
FIG. 3 shows a perspective view of a second alternative embodiment of a driving member of a device according to the invention.

FIG. 3 shows a support 8*a* in which the driving members 10*a* are connected to one another and are mounted on rollers, and can be advanced along the support 8*a*. This is symbolically indicated by arrow 30. The driving members 10*a* are provided with spring means 31 and pivoting arms 35. A configuration of this nature enables the path of the driving members 10*a* to be adapted easily to, for example, the above-mentioned arbitrary course or variable-height course of the slot 12*a*.

Figure 4:
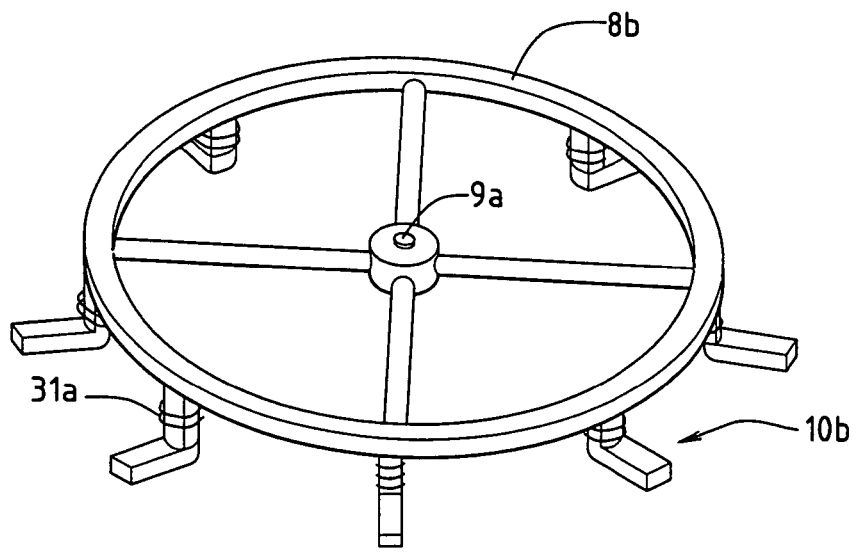
FIG. 4 shows a perspective view of a third alternative embodiment of a driving member of a device according to the invention.

FIG. 4 shows a support 8*b* in an alternative embodiment, in which it is composed of a ring with spokes and can rotate in its entirety about an axis 9*a*. The driving members 10*b* are provided on the circumference of the support 8*b* and are provided with spring means 31*a* similar to the spring means 31 shown in FIG. 3, and pivoting arms 35*a*.

Figure 5:
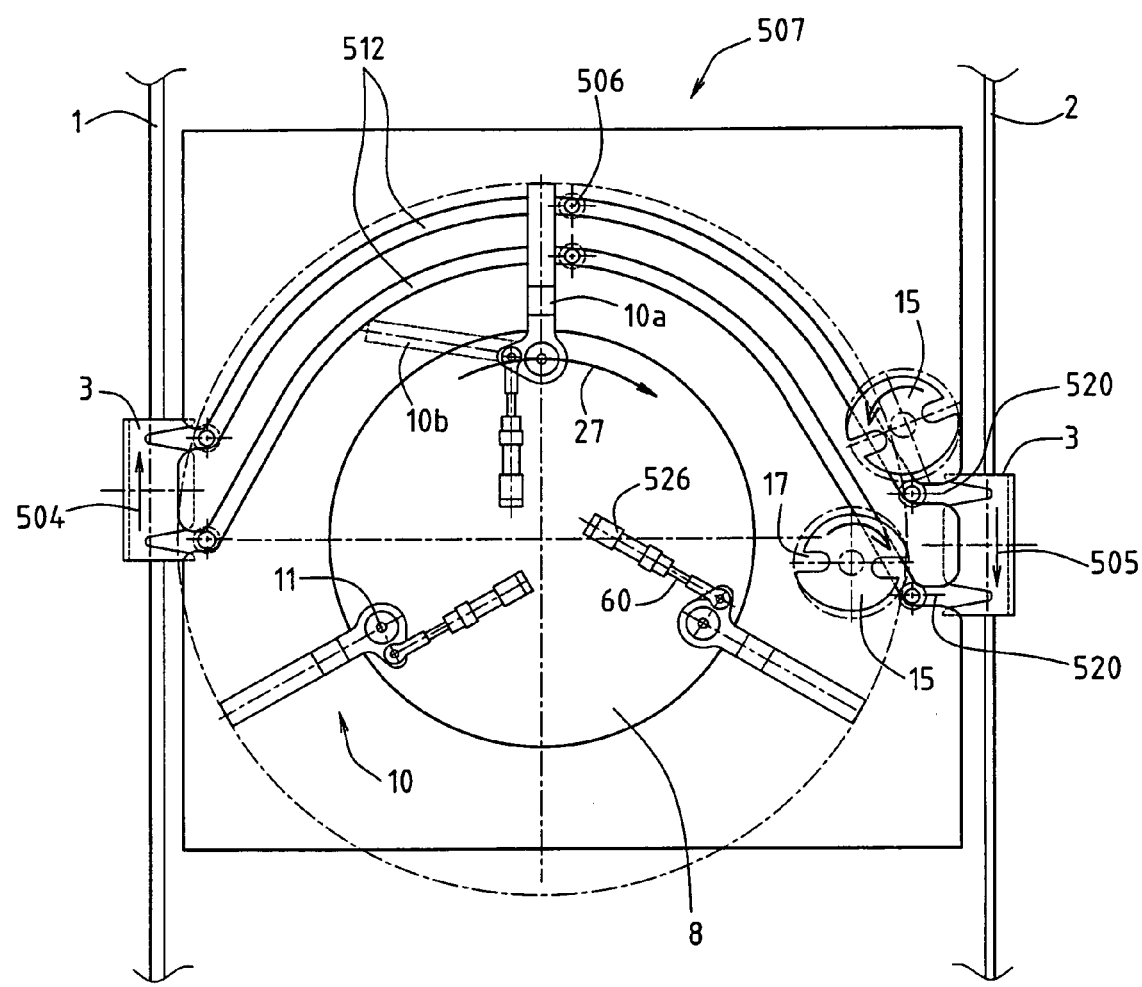
FIG. 5 diagrammatically shows a view from below of a first alternative embodiment of a device according to the invention.

FIG. 5 diagrammatically shows a variant of the conveyor device shown in FIG. 1, denoted overall by 507, the conveyor device 507 being provided with two substantially curved slots 512 which run at a distance from one another and are designed to carry and support therein the legs of slaughtered animals 506.

In a similar way to the conveyor device shown in FIG. 1, the conveyor device 507 shown in FIG. 5 is provided with a plurality of driving members 10 which are arranged on a rotatably driven support 8 and are pivotably connected to the support 8 via a pivot 11. The driving members 10 are shown in two limit positions, namely a first limit position 10*a*, in solid lines, and a second limit position 10*b*, in dashed lines. In a first limit position, the driving members 10 span the two slots 512, while in the second limit position 10*b* the driving members 10 do not span the two slots 512.

Single-acting or double-acting cylinders 526 are arranged on the support 8 and are pivotably connected to the driving members 10 via an arm 60. By actuation of a cylinder 526, it is possible for the arm 60 to be retracted or extended. In the fully retracted position of the arm 60, a driving member 10 adopts the second limit position 10*b*, while in the fully extended state of the arm 60, the driving member 10 adopts the first limit position 10*a*. The cylinders 526 may also, for example, be controlled in such a manner, by control means (not shown), that the driving members 10 can adopt any desired position between the limit positions 10*a*, 10*b*.

In the variant of the device according to the invention which is shown in FIG. 5, the conveyor device 507 interacts with a first conveyor 1, which is diagrammatically depicted, at an entry end to the slot 512, and with a second conveyor 2, which is likewise diagrammatically depicted, at a discharge end of the slots 512. Product carriers 3 are moved along the first conveyor 1 and along the second conveyor 2 in the direction of arrows 504 and 505, respectively. The product carriers 3 are designed to carry and support the slaughtered animals 506 and, at least in the vicinity of the entry end and in the vicinity of the discharge end, are at an angle, in particular at right angles, to their conveying direction.

A slaughtered animal 506 which is selected to be transferred from the first conveyor 1 to the second conveyor 2, for example in the manner which has already been described above, is supplied to the supply end of the slots 512 with the aid of supply means (not shown in the figure). The slaughtered animal 506 then hangs in the slots 512 by its legs and can be conveyed via the slots 512 towards the discharge end, where the slaughtered animal 506 can be discharged to an unoccupied product support 3, which is being advanced along the second conveyor 2. The driving members 10 move the slaughtered animals 506 along in the direction of the arrow 27 in the known way, for which purpose the driving members 10 are moved into the first limit position 10a as a result of the arm 60 being extended.

At the discharge end of the slots 512 there are two identical, rotatably driven discs 15, each provided with two diametrically opposite holding slots 17 which are designed to hold a leg of a slaughtered animal 506. If an unoccupied product carrier 3 is situated in the vicinity of the discharge end of the slots 512, the discs are actuated by discharge-control means (not shown), so that the slaughtered animal 506 is taken from the slots 512 and is placed into a double waiting slot 520, and then, with the aid of discharge means (not shown in the figure), is placed into the available product carrier 3.

If slaughtered animals 506 are indeed supplied to the slots 512 from the first conveyor 1 but no slaughtered animals 506 are being or can be discharged at the discharge end of the slots 512, a plurality of slaughtered animals 506 will collect at the discharge end. To prevent slaughtered animals 506 which have collected along the slots 512 from being damaged by the driving members 10 moving past them, the carriers 10 in question are rotated towards or all the way into the second limit position 10b as a result of the relevant cylinder 526 being controlled in a suitable way. This may, for example, be achieved by enabling the relevant driving member 10 to fall back immediately or after a short time if a certain pressure is experienced by the relevant cylinder 526 as a result of the collected slaughtered animals 506 forming an obstacle to the moving driving member 10. It is also conceivable for all the driving members 10 to be made to adopt the second limit position 10b, so that the support 8 can continue to rotate without slaughtered animals 506 being displaced along the slots 512.

Figure 6:
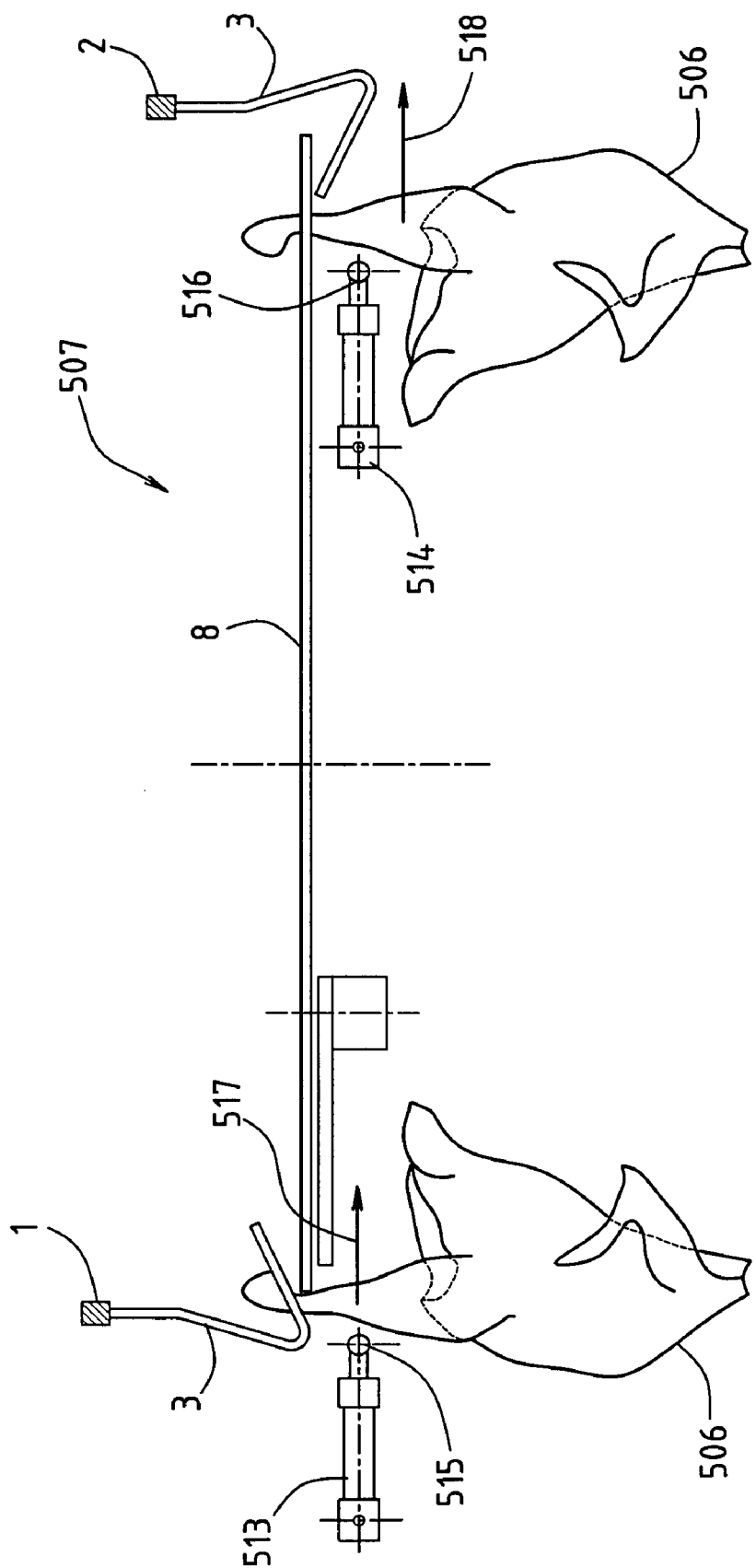
FIG. 6 diagrammatically shows a side view of the first alternative embodiment shown in FIG. 5.

FIG. 6 diagrammatically shows a side view of the conveyor device 507 illustrated in FIG. 5, having the support 8, the product carriers 3, which are being moved, in the known way, along the first conveyor track 1, which is illustrated in very diagrammatic form, and the second conveyor track 2, and slaughtered animals 506.

At the supply end of the slots 512 (not shown) there are supply means which are designed to supply the slaughtered animals 506 to the slots 512 from the product carriers 3. The supply means comprise a first cylinder 513 having an ejector member 515. At the discharge end of the slots 512 there are discharge means which are designed to discharge the slaughtered animals 506 from the waiting slots 520 and comprise a cylinder 514 having an ejector member 516. If a selected slaughtered animal 506 which is being moved along the first conveyor track 1 has to be transferred from the first conveyor track 1 to the second conveyor track 2, the cylinder 513, as soon as the slaughtered animal 506 is situated at the supply end of the slots 512, is actuated in such a manner that the ejector member 515 is displaced in a direction indicated by arrow 517, so that the slaughtered animal 506 is pressed out of the product carrier 3 and into the slots 512.

In a similar way, the slaughtered animals 506 are discharged from the slots 512 when the product carrier 3, which is being moved along the second conveyor track 2 and into which the slaughtered animal 506 is to be placed, is situated at the discharge end of the slots 512. The cylinder 514 is then actuated in such a manner that the ejector member 516 is displaced in a direction denoted by arrow 518, so that the slaughtered animal 506 is pressed out of the waiting slots 520 and into the available product carrier 3.

Figure 7:
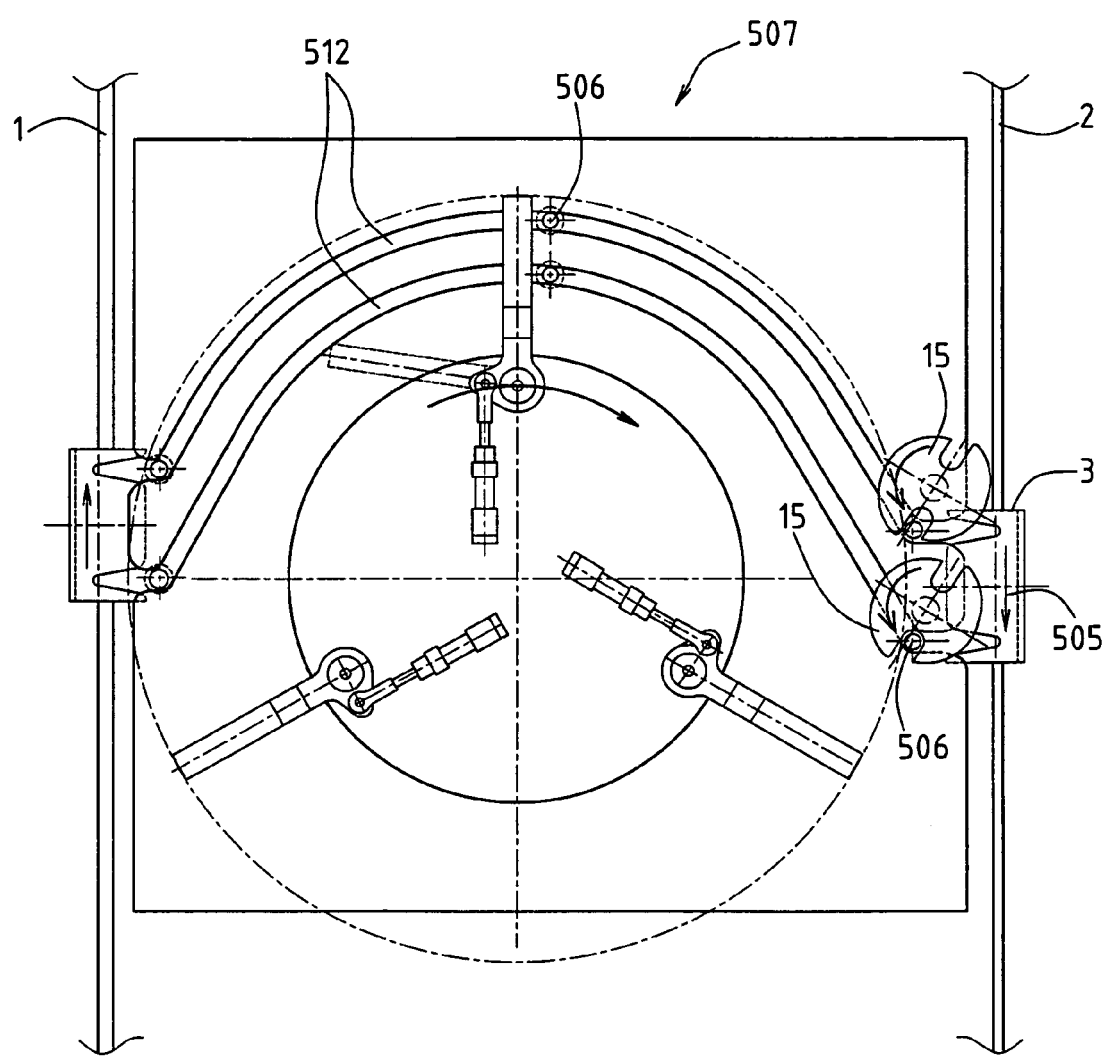
FIG. 7 diagrammatically shows a view from below of a second alternative embodiment of a device according to the invention.

FIG. 7 diagrammatically shows a variant of the conveyor device 507 shown in FIG. 5, the conveyor device 507 being designed, at the discharge end of the slots 512, without the discharge means shown in FIG. 6. To ensure that the slaughtered animals 506 are reliably discharged from the slots 512, the rotatably driven discs 15 are displaced towards the second conveyor track 2 compared to the embodiment shown in FIG. 5. As a result, the rotatably driven discs 15 can place the slaughtered animals 506 directly into the product carrier 3 which is being moved in the direction of arrow 505.

Preferably, the product carriers adopt the position adopted in FIGS. 5, 6 and 7 if the conveyor device according to the invention uses two slots. However, it is also conceivable for the product carriers, when the product carriers are situated at the supply end or the discharge end, to be rotated about a vertical axis, so that the position of the product carriers can be adapted to the course of the slots at the location of the supply end or discharge end. As a result, the slaughtered animals can be supplied to the slots in a manner described in FIG. 1, and there is no need to take any measures for synchronizing the movements of the product carriers and the supply means.

The distance between the recesses in the respective product carriers 504 and 505 shown in FIGS. 5 and 7 in each case form a pitch. It is not necessarily the case that each type of product carrier has the same pitch. If the distance between the slots 512 at the supply end and the discharge end is allowed to differ, it is very easy to enable the poultry to be transferred between product carriers of different pitches. It is also possible, for example for the purpose of differences in dimensions between successive pairs of poultry, to vary the distance between the slots 512 by making these slots displaceable, preferably slideable, with respect to one another.

Figure 8:
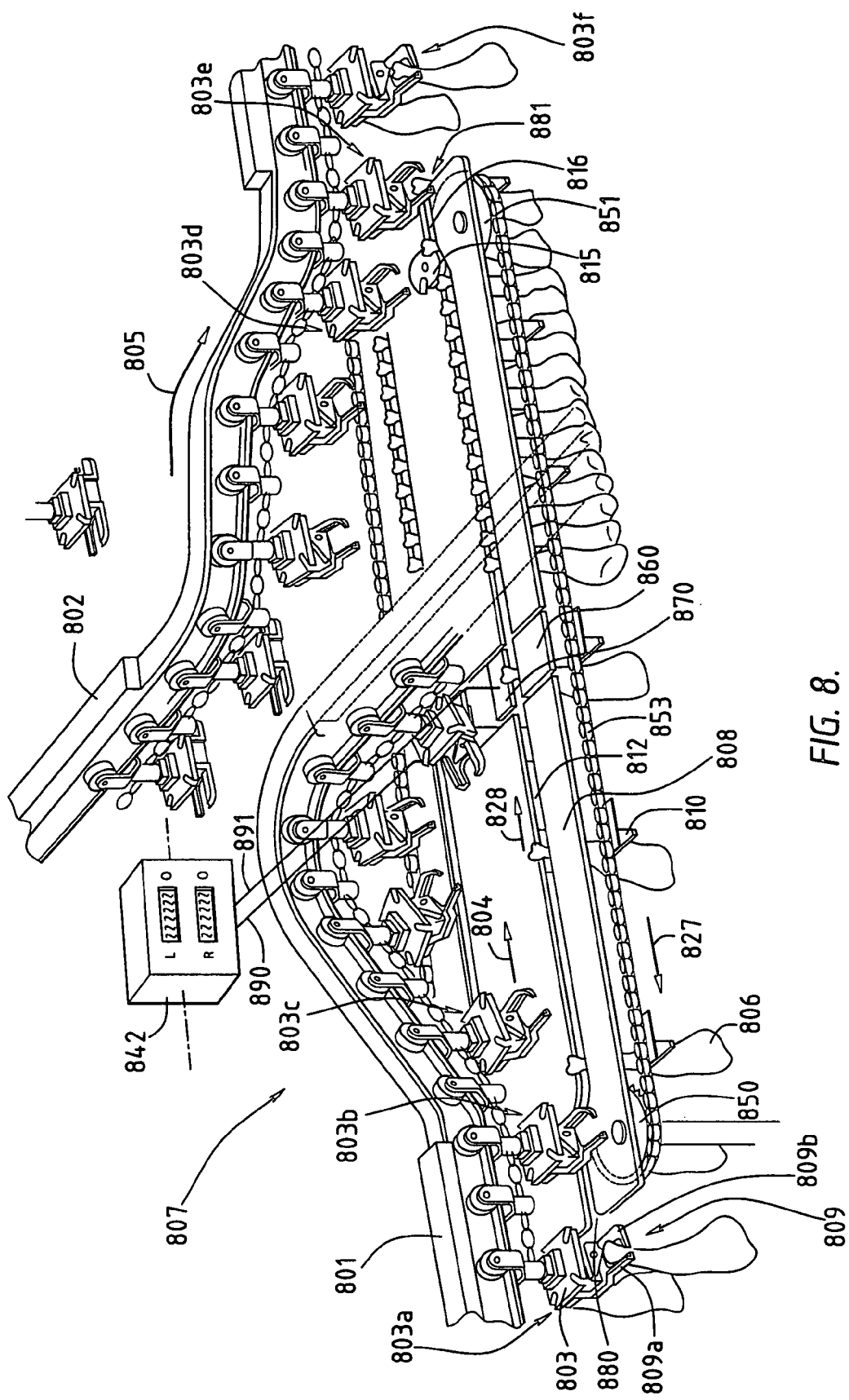
FIG. 8 diagrammatically shows a perspective view of a third alternative embodiment of a device according to the invention.

FIG. 8 shows a device 807 according to the invention in a linear embodiment, situated between a first conveyor 801 and a second conveyor 802. Product carriers 803 are moved along the first conveyor 801 and the second conveyor 802 in a direction indicated by arrows 804 and 805, respectively. In the product carriers 803 of the first conveyor 801 there are legs 806 of slaughtered poultry, which need to be transferred from the first conveyor 801 to the second conveyor 802.

The product carriers 803 comprise a bracket 809 having a first bracket part 809a and a second bracket part 809b, which are arranged pivotably with respect to one another on the product carrier 803. In the closed position of the bracket 809, indicated by the reference numeral 803a, the legs 806 are substantially annularly enclosed by bracket 809 and are thus carried and supported in the product support 803.

The device 807 comprises a stationary support 808 in the form of a plurality of flat plates which are connected to a frame (not shown). The support 808 is provided with two identical slots 812 which extend substantially in a straight line between a first conveyor 801 and a second conveyor 802, the slots 812 being designed to carry and support therein the legs 806.

The two slots 812, which are referred to below as the slot 812 for the sake of simplicity, have a supply end 880 for receiving the legs 806 in the slot 812, and a discharge end 881 for discharging the legs 806 from the slot 812.

A first and a second rotatable chain-wheel 850, 851 are arranged on the underside of the support 808 near the supply end 880 and the discharge end 881 of the slot 812, at least one chain-wheel 850, 851 being driveable. A drive chain 853 is arranged around the chain-wheels 850, 851, the drive chain 853 being substantially parallel to the course of the slots 812. In the configuration shown in FIG. 8, the slots 812 extend substantially in a horizontal plane. To prevent the drive chain 853 from sagging, it is possible for guide elements (not shown) which are designed to support the drive chain 853, to be arranged along the course of the drive chain 853. A plurality of driving members 810, which are advanced in a direction indicated by arrow 827, are provided at intervals from one another on the drive chain 853. Since the drive chain 853 is guided around the chain-wheels 850, 851, the driving members 810 will move along the course of the slots 812 in a direction corresponding to that indicated by arrow 828. The driving members 810 are arranged in such a manner on the drive chain 853 that they are directed radially outwards. The dimensions of the driving members 810 and the diameter of the chain-wheels 850, 851 are selected in such a manner that the driving members 810 span all or at least part of the width of the slots 812. As a result, a leg 806 which is situated inside the slot 812 and in front of a driving member 810 will be carried along with the movement of the driving member 810 and consequently will be moved from the supply end 880 towards the discharge end 881.

In the vicinity of its discharge end 881, the slot 812 has a rotatably driven disc-like driving member 815 which is designed to discharge the legs 806 from the slot 812 to the discharge end 881, in particular to a waiting slot 816 provided in the vicinity of the discharge end 881.

In the slot 812, the device 807 has a weighing device 860 which is used to weigh the legs 806 while they are being transferred from the supply end 880 to the discharge end 881. A leg 806 which is located at the weighing device 860 can be removed from the slots 812 by increasing the width of the corresponding slot 812 at the location of the weighing device 860. For this purpose, a slideable plate member 870 is provided, which can slide in a direction indicated by arrow 862. Whether or not a leg 806 is removed from the slot 812 depends on the detected weight. As indicated by arrow 890, the detected weight of the legs 806 is fed to a control device 842, which is diagrammatically represented. The detected weight of the leg 806 is compared with, for example, a set value in the control device 842, on the basis of which comparison the control device 842 optionally actuates the weighing device 860 so as to release the leg 806 there. This is indicated by arrow 891.

To enable the legs 806 which need to be transferred from the first conveyor 801 to the second conveyor 802 to be supplied to the supply end 880 of the slot 812, the product carriers 803 of the first conveyor 801 are moved towards the supply end 880 of the slot 812, specifically in such a manner that the product carriers 803 are situated just above the support 808. The distance between the slots 812 and the pitch of the product carriers 803 of the first conveyor 801 substantially correspond. When the legs 806 are situated in the vicinity of the supply end 880 of the slot 812, the bracket 809 of the product carrier 803 in question is opened, in a manner which is not shown in more detail but is known per se, as indicated by the reference numeral 803b. The legs 806 are then no longer carried and supported by the bracket 809, but rather by the slot 812, in particular its supply end 880. The product carrier 803 are moved further along the first conveyor 801 in the direction of arrow 804 and, in the process, their first bracket part 809 presses against the leg 806, with the result that the leg 806 is pushed onwards in the slot 812. To entirely release the legs 806 from the product carriers 803, the first conveyor 801 runs upwards after the supply end 880 of the slot 812, so that the product carriers 803 are lifted away and lose contact with the legs in the slot 812. This is indicated by the reference numeral 803c.

After they have moved past the weighing station 860, the legs 806 may be temporarily stored between the discharge end of the slots 812 and the weighing station 860 and are then moved out of the slot 812 into a waiting slot 816 by the disc-like driving members 815. At the discharge end 881 of the slot 812, the legs 806 are released to product carriers 803 which are moving along the second conveyor 802. This takes place in a similar way to that in which the legs 806 are picked up at the supply end 880 of the slot 812, except in the reverse order. In the vicinity of the discharge end 881 of the slot 812, the second conveyor 802 runs downwards, and the open product carriers 803 are moved downwards. This is indicated by the reference numeral 803d. The legs 806 which are to be picked up by the product carriers 803 are situated in the waiting slot 816. The open product carrier 803 is placed over that part of the leg 806 which projects above the slot 812 and the first bracket part 809a pushes the leg 806 out of the waiting slot 816. This is indicated by the reference numeral 803e. Then, the bracket 809 is closed in a manner which is not shown but is known per se, and the leg 806 has been picked up by the product carrier 803. This is indicated by the reference numeral 803f.

Figure 8A:
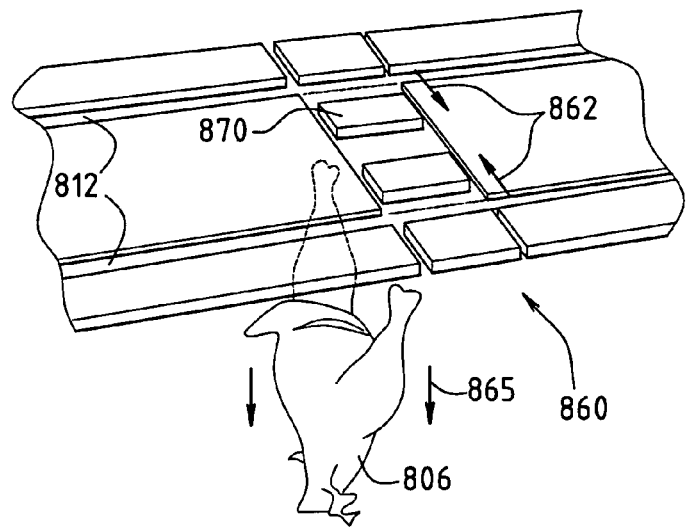
FIG. 8a diagrammatically shows a detail of a section of the device shown in FIG. 8.

The removal of a slaughtered animal 806 or part thereof from the at least one slot 812 at the weighing device 860 is shown in more detail in FIG. 8a.

If a slaughtered animal 806 or part thereof is selected for removal from the slot 812 on the basis of the detected weight, the weighing device 860, as described above, is actuated by the control device 842 in such a manner that the plate member 870, one plate member 870 for each slot 812, slides in the direction of arrow 862. As a result, the width of the slot 812 is increased at the location of the weighing device 860, so that it is impossible for a slaughtered animal 806 or a part thereof to be supported in the slot 812, and consequently the slaughtered animal 806 or part thereof will fall out of the slot 812 under the influence of the force of gravity, in a direction indicated by arrow 865.

Figure 9B:
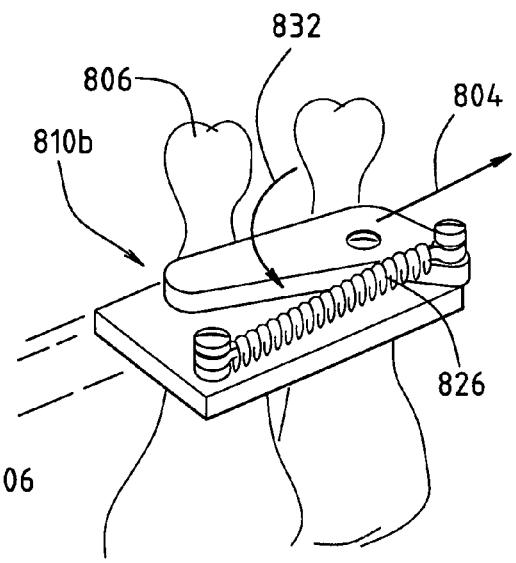
FIG. 9b shows a detail view of a driving member of the device shown in FIG. 8, in a second limit position.
Figure 9A:
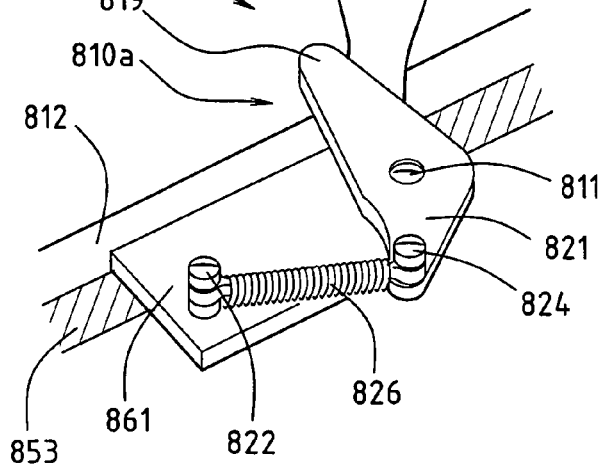
FIG. 9a shows a detail of a carrier of the device shown in FIG. 8, in a first limit position.

FIGS. 9a and 9b show a detailed view of a driving member 810 in a first limit position 810a and a second limit position 810b. The driving member 810 is connected to the drive chain 853 via a support 861. The driving members 810 comprise an arm 819 which is connected to the support 861 in such a manner that it can pivot about an axis 811. Opposite the arm 819, the driving member 810 has a projection 821 which, via a pivot 824, is connected to a first end of a tension spring 826, the second end of the tension spring 826 being connected to the support 861 via a projection 822. In the situation shown in FIG. 9a, the driving member 810 is situated in the first limit position, in which the leg 806 is being moved in the direction of arrow 827. In the situation of the driving member 810 shown in FIG. 9b, the driving member 810 is in the second limit position. In the direction indicated by the arrow 827 there are a plurality of legs 806 and the legs 806 cannot be conveyed further towards the discharge end 811 of the slot 812. To prevent the driving members 810 from damaging the legs 806, the driving members 810 can be rotated in a direction indicated by arrow 832. As a result of the rotation of the driving member 810 in the direction of arrow 832, the tension spring 826 will be extended and the driving member 810 will be subjected to a restoring force which tends to rotate the driving member 810 back towards the first limit position of the driving member 810.

Figure 10:
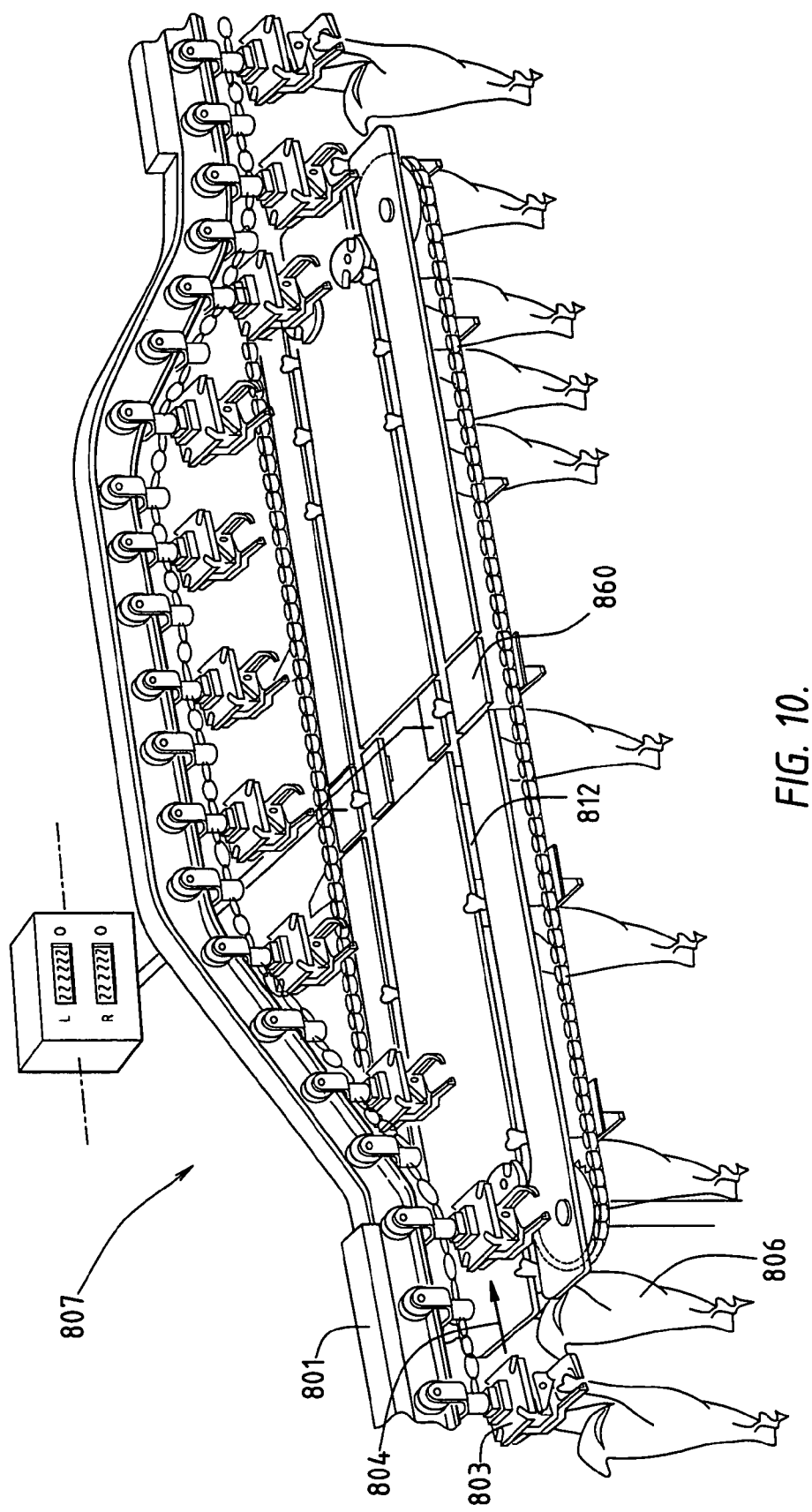
FIG. 10 diagrammatically shows a perspective view of a fourth alternative embodiment of a device according to the invention.

FIG. 10 shows a variant of the preferred embodiment of the device 807 shown in FIG. 8, in which the slaughtered animals 806 or parts thereof are not transferred from a first conveyor to a second conveyor, but rather the slaughtered animals 806 or parts thereof, in particular entire carcasses 806, are removed from the product carriers 803, which are moving along the conveyor 801 in the direction of arrow 804, and are placed in the slots 812 in order, for example, to be weighed and are then put back in the same conveyor 801, although shifted one product carrier 803 downstream compared to their original product carrier 803. As a result, it is possible for the slaughtered animals 806 or parts thereof to be taken back out of the product carrier 803 for a brief period further downstream, for example for a weighing or correctional treatment, before the slaughtered animals 806 or parts thereof are then hung back in the product carriers 803 shifted one product carrier 803 upstream, so that the product carriers 803 they are in then correspond to the product carriers 803 in which the slaughtered animals 806 or parts thereof were hung originally, i.e. before they passed through the device 807.

The carcasses 806 are taken out of the product carriers 803 and put into the slots 812 and are picked up from the slots 812 by the product carriers 803 at the supply end 880 and the discharge end 881 of the slots 812 in the same way as that which has already been described above and therefore requires no further explanation.

The carcasses 806 are weighed by the weighing device 860 arranged in the slot 812.

Figure 11:
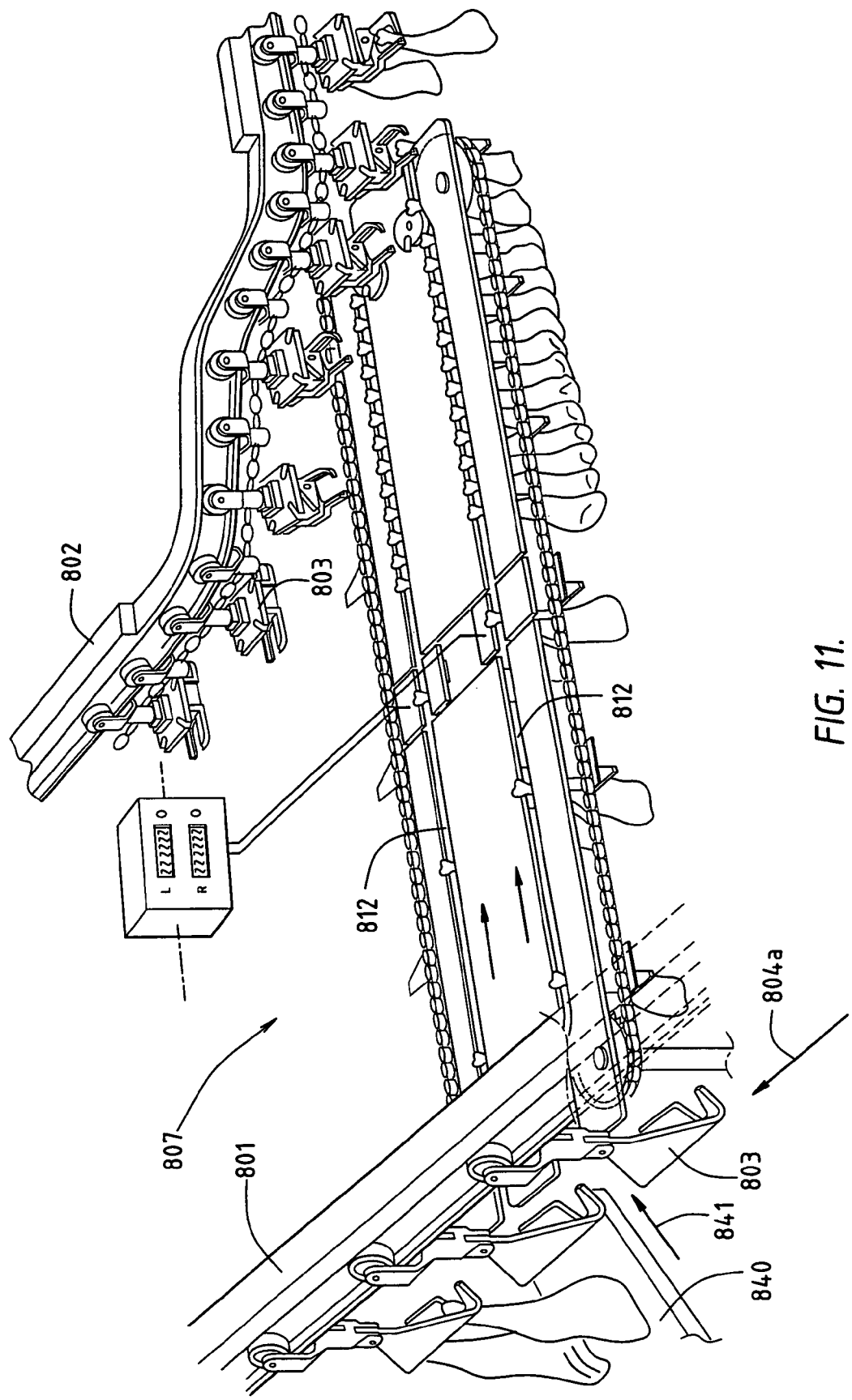
FIG. 11 diagrammatically shows a perspective view of a fifth alternative embodiment of a device according to the invention, located between different conveyor paths.

FIG. 11 likewise shows a variant of the device 807 shown in FIG. 8, whereby the first conveyor 801 and the second conveyor 802 convey different kinds of product carriers 803. In this case, the first conveyor 801 is substantially at right angles to the slots 812 of the device 807, while the second conveyor is located substantially parallel to the slots 812. The product carriers 803 of the first conveyor 801 are moved, for example, in a direction indicated by arrow 804a. It is not necessary for the product carriers 803 of the first conveyor 810 and the product carriers 803 from the second conveyor 802 to have the same pitch, and consequently the distance between the slots 812 may vary at the supply end and at the discharge end of the slots 812.

An expulsion mechanism 840 is arranged along the first conveyor track 801, in the vicinity of the supply end 880 of the slot 812. The expulsion mechanism 840 comprises an ejector which can be extended in a direction indicated by arrow 841. When a product carrier 803 holding legs 806 which have been selected to be transferred from the first conveyor 801 to the second conveyor 802 is situated in front of the supply end 880 of the slot 812, the ejector is extended in the direction of the arrow 841, and the legs 806 are expelled from the product carrier 803 into the respective slots 812. The expulsion mechanism 840 may, for example, be designed in accordance with the principles of the ejector member 516 shown in FIG. 6.

Figure 12:
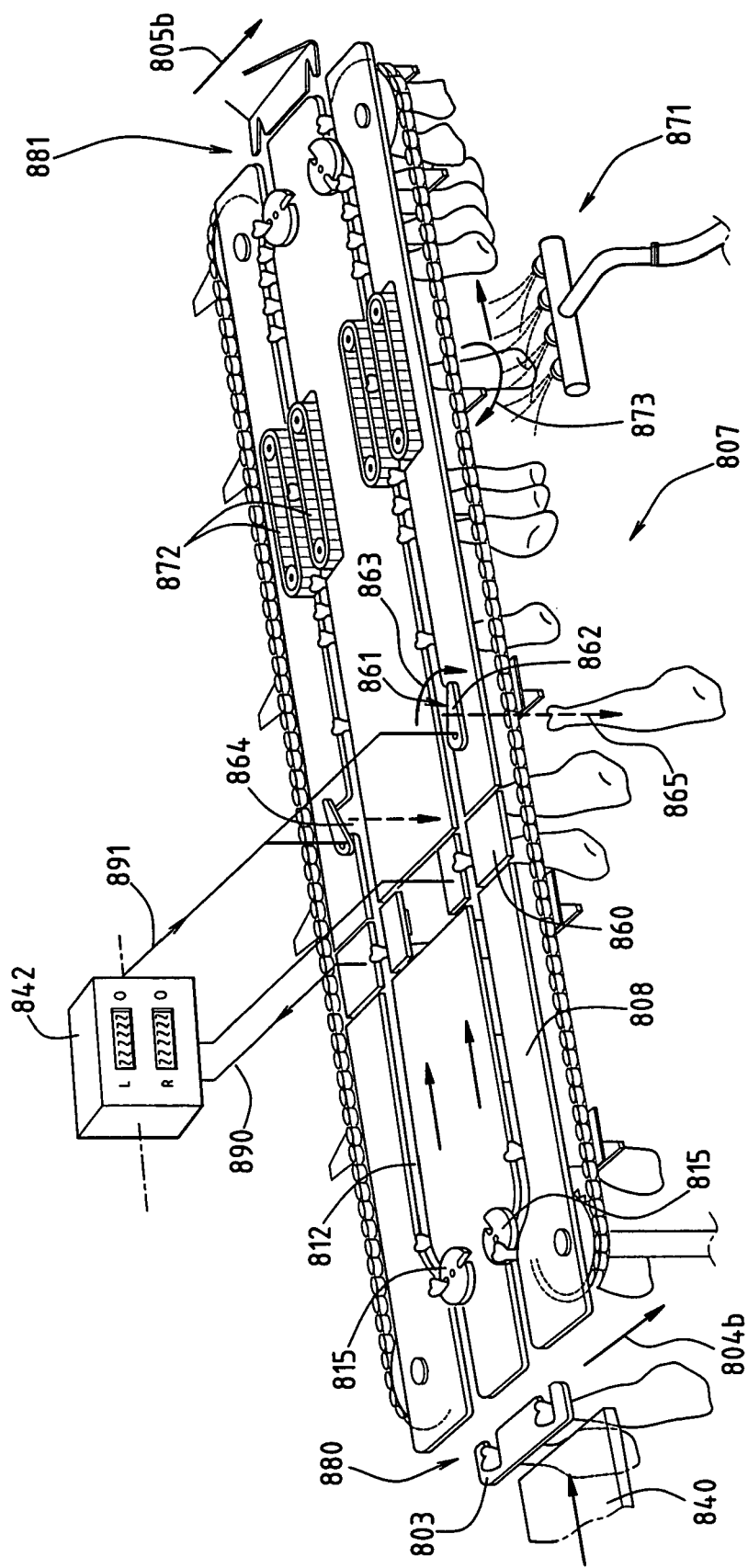
FIG. 12 diagrammatically shows a perspective view of a device according to the invention with a processing step.

FIG. 12 shows a device 807 in which legs 806 are being conveyed from the supply end 880 of the slots 812 towards the discharge end 881 thereof in the manner described above. At the supply end 880 of the slot 812, the legs 806 are supplied from a product carrier 803 by the expulsion mechanism 840. In this case, the product carrier 803 is, for example, advanced in a direction indicated by arrow 804b, along a conveyor which is not shown. At the discharge end 881, the legs 806 are taken out of the slot 812 in the known way by a product carrier 803 which is moving along a conveyor (not shown), the product carrier 803 being moved, for example, in a direction indicated by arrow 805b.

The device 807 is provided with two disc-like driving members 815 at the supply end 880 of the slot 812, one driving member 815 for each slot 812, for putting the legs 806 into the slot 812 from the supply end 880. In the embodiment of the device 807 shown in FIG. 12, the functions of weighing the legs 806 and removing them from the slots 812 are carried out separately by an unloading device. The legs 806 are weighed in the weighing device 860, and the detected weight is fed to the control device 842, as indicated by arrow 890. The legs 806 can be removed from the slots 812 with the aid of an unloading device 861 provided for this purpose. For each slot 812, the unloading device 861 has an arm 862 which is arranged on the support 808 so that it can pivot substantially in a horizontal plane. At the unloading device 861, the slot 812 has a widened section 864 in which the legs 806 can be supported by the arm 862. If a leg 806 which, for example on the basis of the detected weight, has been selected for removal from the slot 812 is situated at the unloading device 861, the arm 862 is actuated in such a manner, as indicated by arrow 891, that it rotates in the direction of the arrow 863 and thus leaves the widened section 864 clear, so that the leg 806 will fall out of the slot 812 in a direction indicated by arrow 865.

Along the slots 812, the device 807 is provided with a processing device 871, in the case shown a marinating station. The processing device 871 comprises two driven conveyor belts 872 arranged along a section of the slot 812. The conveyor belts 872 are designed to clamp around part of the legs 806 and to move the legs 806 towards the discharge end 881 of the slot 812. The direction and/or speed of movement of the respective conveyor belts 872 may differ, so that a rotational movement can be imposed on the legs 806, for example in a direction indicated by an arrow 873. Particularly if the processing device 871 is a marinating station, as shown, it is in this way possible to ensure that the legs 806 are well covered with marinade.

Figure 13A:
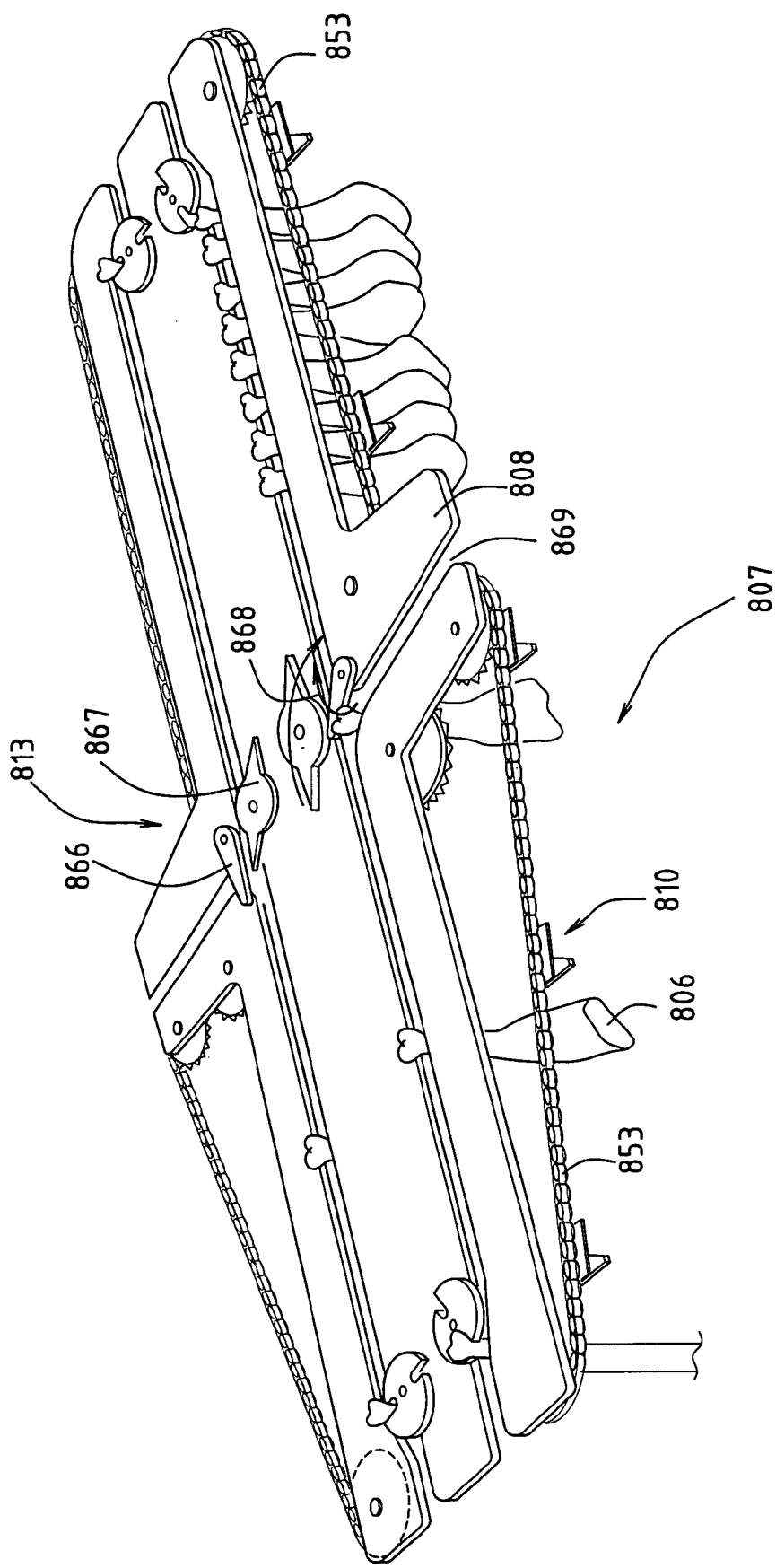
FIG. 13a diagrammatically shows a perspective view of a variant of the device according to the invention shown in FIG. 12.
Figure 13B:
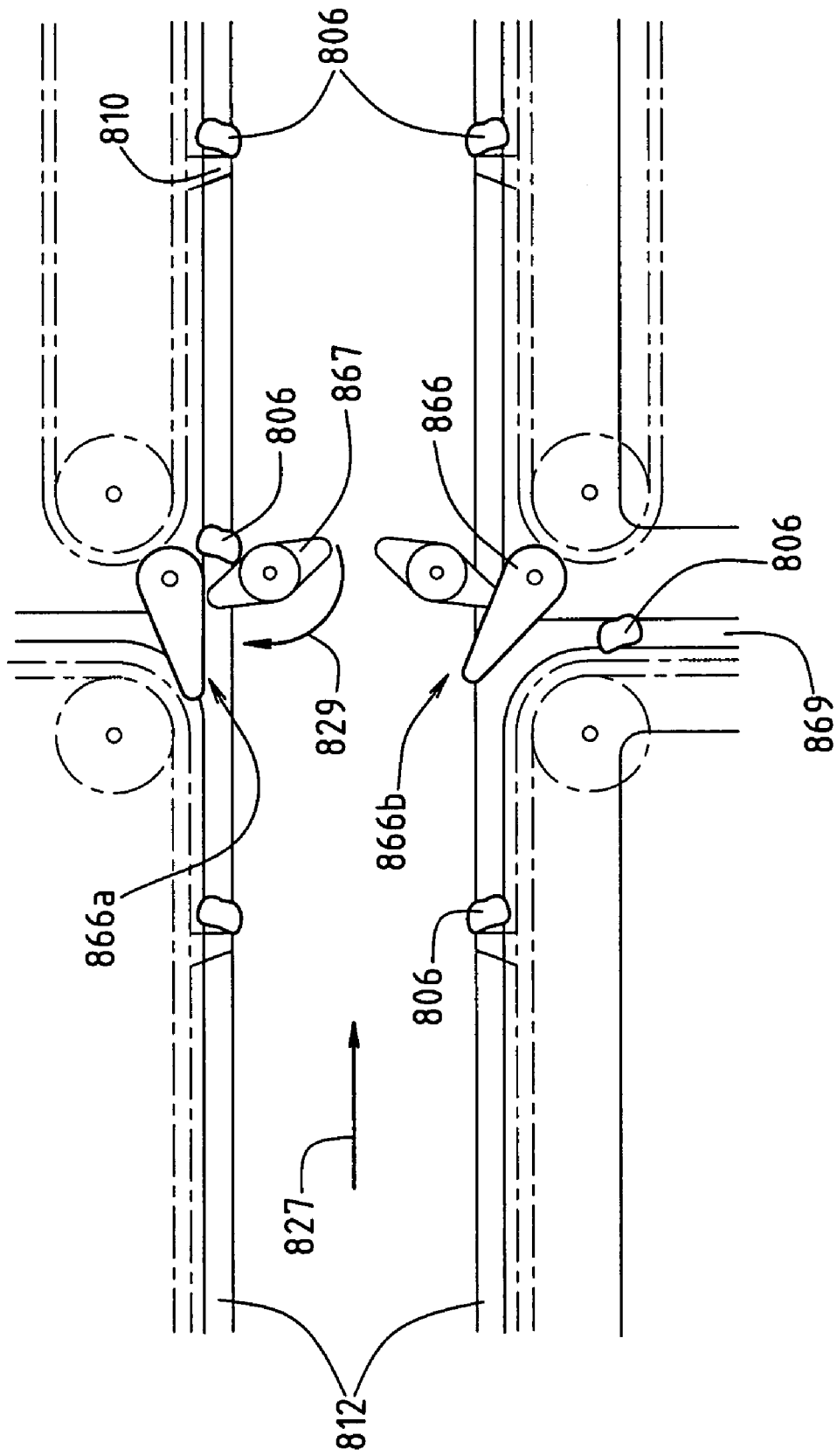

FIGS. 13a and 13b show a variant of the device 807, with a split arranged in the slots 812, so that it is possible to discharge the legs 806 sideways from the slots 812. For this purpose, a controllable switching mechanism 813 for each slot 812 is arranged on the support 808. The switching mechanism 813 comprises a controllable switching arm 866 which is arranged pivotably on the support 808 and can adopt a first position 866a and a second position 866b, and a rotatably driven, disc-like carrier 867. The switching arm and 866 the disc-like carrier 867 are controlled by control means (not shown). The legs 806 which are situated in the slot 812 are moved inside the slot in the direction indicated by arrow 827 by the driving members 810. If a leg 806 has been selected for removal from the slot 812, for example on the basis of the detected weight, colour, dimensions and the like, the course of the slot 812 in the direction of arrow 827 is closed off as a result of the switching arm 866 being rotated from its first position 866a towards its second position 866b, as indicated by arrow 868. As a result, the leg 806 is forced to leave the slot 812 and is placed into a slot 869. To enable the legs 806 to be moved out of the slot 812 into the slot 869, the drive chain 853 is diverted and the drive chain 853 also covers the slot 869. A second, corresponding drive chain 853a is provided along the further course of the slot 812, i.e. that part of the slot 812 which is situated downstream of the slot 869.

If the leg 806 is not to be removed from the slot 812, the switching arm 866 adopts its first position 866a, in which the course of the slot 812 is not closed off.

The driveable carrier 867 is arranged along that section of the slot 812 which lies at the location of the slot 869 and along which the drive chain 853 does not extend. A leg 806 which is not to be moved from the slot 812 into the slot 869 is moved in the direction of arrow 827 by the driveable carrier 867 as a result of the driveable carrier 867 being rotated in a direction indicated by arrow 829.

Legs 806 are being conveyed in the devices 807 shown in FIGS. 8, 11, 12, 13a and 13b. It will be clear that the embodiments shown are not restricted to conveying legs, but rather that it is also possible to use the devices shown to convey entire carcasses of poultry. It is also true for the device shown in FIG. 10 that legs or other parts of slaughtered animals can be conveyed instead of entire carcasses.

The driving members shown in the figures have an arm which is able to execute a rotary movement about a substantially vertical axis. However, it is also conceivable for the driving members to be able to execute a translational movement instead of a rotational movement. In that case, the driving members are moved along a line in order to optionally span the at least one slot. It is also possible, instead of arms which are pivotably connected to the support and comprise force means such as compression springs, torsion springs or cylinders, to use leaf springs which, instead of a pivoting movement, can execute a bending movement when the arms need to pass by slaughtered animals which have collected in the vicinity of the discharge end of the slot or slots without damaging these animals.

Yet another option is for a flexible, finger-like element, such as a plucking finger which is normally used to remove feathers from poultry, to be used as the driving member.

While the invention has been described and illustrated in its preferred embodiments, it should be understood that departures may be made therefrom within the scope of the invention, which is not limited to the details disclosed herein.

What is claimed is:

1. A device for processing slaughtered animals or parts thereof, having a first and a second station, comprising:
   a. a transfer conveyor which extends between the first station and the second station and which comprises at least one substantially stationary slot with a width, a course, a supply end and a discharge end, which at least one slot comprises a first opening at the supply end of the at least one slot and a second opening at the discharge end of the at least one slot, wherein the at least one slot is designed to carry and support slaughtered animals or parts thereof, the transfer conveyor further comprising at least one driving member which passes through a path which is substantially parallel to the course of the at least one slot and is designed to move the slaughtered animals or parts thereof which are situated in the at least one slot along the at least one slot from the first station towards the second station, wherein the at least one driving member spans at least half the width of the at least one slot;
   b. supply means for supplying at the first station slaughtered animals or parts thereof from a first conveyor to the at least one slot of the transfer conveyor, wherein the supply means are adapted to control which slaughtered animals or parts thereof from the group of slaughtered animals or parts on the first conveyor are supplied to the transfer conveyor, and which slaughtered animals or parts thereof from the group of slaughtered animals or parts on the first conveyor are not supplied to the transfer conveyor; and
   c. discharge means for discharging the slaughtered animals or parts thereof from the at least one slot of the transfer conveyor at the second station.

2. The device of claim 1, wherein the at least one driving member can adopt a first position and a second position, in which the slaughtered animals or parts thereof can and cannot, respectively, be moved from the first station towards the second station.

3. The device of claim 1, wherein the at least one driving member can rotate about an axis which is substantially perpendicular to the path covered by the at least one driving member.

4. The device of claim 1, wherein the at least one driving member comprises at least one arm which is designed to transmit the movement of the at least one driving member to the slaughtered animals or parts thereof.

5. The device of claim 2, comprising force means which exert a force on the at least one driving member, which force opposes the movement of the at least one driving member from the first position towards the second position.

6. The device of claim 5, wherein the force means comprise spring means.

7. The device of claim 5, wherein the force means comprise a controllable piston-cylinder device.

8. The device of claim 7, wherein the piston-cylinder device can make the at least one driving member adopt any desired position between the first position and the second position.

9. The device of claim 1, wherein the discharge means are designed to selectively discharge the slaughtered animals or parts thereof from the at least one slot.

10. The device of claim 9, wherein the supply means comprise a switching mechanism which can be moved into a first switched position and a second switched position, in which the slaughtered animals or parts thereof are and are not, respectively, supplied to the at least one slot.

11. The device of claim 9, wherein the supply means and/or the discharge means are controlled by supply-control means and discharge-control means on the basis of data relating to the slaughtered animals or parts thereof to be transferred.

12. The device of claim 1, wherein the supply means and/or the discharge means comprise at least one disc which is driven in rotation and is designed to supply or remove the slaughtered animals or parts thereof one by one to or from the at least one slot, and which is provided on its circumference with at least one holding slot which opens out on the outer circumference of the at least one rotatably driven disc and is designed to carry and support at least one slaughtered animal or part of a slaughtered animal.

13. The device of claim 12, wherein the at least one rotatably driven disc has at least two holding slots.

14. The device of claim 12, wherein the at least one rotatably driven disc of the discharge means transfers the slaughtered animals or parts thereof into a stationary waiting slot.

15. The device of claim 1, wherein the at least one slot extends substantially in a horizontal plane.

16. The device of claim 1 wherein the at least one slot has a substantially curved course.

17. The device of claim 1, wherein the at least one slot has a substantially straight course.

18. The device of claim 1, wherein an unloading device is provided inside the at least one slot.

19. The device of claim 18, wherein the unloading device is designed to locally widen the at least one slot.

20. The device of claim 19, wherein the unloading device comprises a support member which defines a section of the at least slot and can move substantially transversely with respect to the course of the at least one slot, for locally increasing the width of the at least one slot.

21. The device of claim 18, wherein unloading-control means are provided for controlling the unloading device.

22. The device of claim 21, wherein a weighing device is incorporated in the at least one slot for weighing the slaughtered animals or parts thereof.

23. The device of claim 22, wherein the unloading-control means record the weight of the slaughtered animals or parts thereof which has been detected by the weighing device and control the unloading device on the basis of this data.

24. The device of claim 1, wherein a processing device is provided along the course of the at least one slot, for processing the slaughtered animals or parts thereof.

25. The device of claim 24, wherein the processing device comprises at least one frictional surface which is arranged along the at least one slot and is designed to act on part of the slaughtered animals or parts thereof.

26. The device of claim 25, wherein the frictional surface forms part of a driven conveyor belt.

27. The device of claim 26, wherein the processing device comprises two driven conveyor belts which are arranged on either side of the at least one slot, for clamping a part of the slaughtered animals or parts thereof between them.

28. The device of claim 26, wherein the processing device comprises at least two driven conveyor belts which are arranged one behind the other along the at least one slot.

29. The device of claim 27, wherein the direction of movement of a first conveyor belt differs from that of a second conveyor belt.

30. The device of claim 27, wherein the speed of movement of a first conveyor belt differs from that of a second conveyor belt.

31. A device for processing slaughtered animals or parts thereof, having a first and a second station, comprising:
   a. at least one substantially stationary slot which extends between the first station and the second station and comprises a width, a course, a supply end, a discharge end, a first opening at the supply end of the at least one slot and a second opening at the discharge end of the at least one slot, wherein the at least one slot is designed to carry and support the slaughtered animals or parts thereof;
   b. supply means for supplying at the first station the slaughtered animals or parts in the at least one slot;
   c. at least one driving member which passes through a path which is substantially parallel to the course of the at least one slot and is designed to move the slaughtered animals or parts thereof which are supplied in the at least one slot along the at least one slot from the first station towards the second station wherein the at least one driving member spans at least half the width of the at least one slot; and
   d. discharge means for discharging the slaughtered animals or parts thereof from the at least one slot, wherein the discharge means are controlled by discharge-control means to discharge the slaughtered animals or parts thereof from the at least one slot at a controllable rate which is independent from the rate with which the slaughtered animals or parts thereof are moved along the at least one slot.

32. The device of claim 31, wherein the at least one driving member can adopt a first position and a second position, in which the slaughtered animals or parts thereof can and cannot, respectively, be moved from the first station towards the second station.

33. The device of claim 31, wherein the at least one driving member can rotate about an axis which is substantially perpendicular to the path covered by the at least one driving member.

34. The device of claim 31, wherein the at least one driving member comprises at least one arm which is designed to transmit the movement of the at least one driving member to the slaughtered animals or parts thereof.

35. The device of claim 32, comprising force means which exert a force on the at least one driving member, which force opposes the movement of the at least one driving member from the first position towards the second position.

36. The device of claim 35, wherein the force means comprise spring means.

37. The device of claim 35, wherein the force means comprise a controllable piston-cylinder device.

38. The device of claim 37, wherein the piston-cylinder device can make the at least one driving member adopt any desired position between the first position and the second position.

39. The device of claim 31, wherein the supply means comprise a switching mechanism which can be moved into a first switched position and a second switched position, in which the slaughtered animals or parts thereof are and are not, respectively, supplied to the at least one slot.

40. The device of claim 31, wherein the supply means and/or the discharge means are controlled by supply-control means and discharge-control means on the basis of data relating to the slaughtered animals or parts thereof to be transferred.

41. The device of claim 31, wherein the supply means and/or the discharge means comprise at least one disc which is driven in rotation and is designed to supply or remove the slaughtered animals or parts thereof one by one to or from the at least one slot, and which is provided on its circumference with at least one holding slot which opens out on the outer circumference of the at least one rotatably driven disc and is designed to carry and support at least one slaughtered animal or part of a slaughtered animal.

42. The device of claim 41, wherein the at least one rotatably driven disc has at least two holding slots.

43. The device of claim 41, wherein the at least one rotatably driven disc of the discharge means transfers the slaughtered animals or parts thereof into a stationary waiting slot.

44. The device of claim 31, wherein the at least one slot extends substantially in a horizontal plane.

45. The device of claim 31, wherein the at least one slot has a substantially curved course.

46. The device of claim 31, wherein the at least one slot has a substantially straight course.

47. The device of claim 31, wherein an unloading device is provided along the at least one slot.

48. The device of claim 47, wherein the unloading device is designed to locally widen the at least one slot.

49. The device of claim 48, wherein the unloading device comprises a support member which defines a section of the at least one slot and can move substantially transversely with respect to the course of the at least one slot, for locally increasing the width of the at least one slot.

50. The device of claim 47, wherein unloading-control means are provided for controlling the unloading device.

51. The device of claim 50, wherein a weighing device is incorporated in the at least one slot for weighting the slaughtered animals or parts thereof.

52. The device of claim 51, wherein the unloading-control means record the weight of the slaughtered animals or parts thereof which has been detected by the weighing device and control the unloading device on the basis of this data.

53. The device of claim 31, wherein a processing device is provided along the course of the at least one slot, for processing the slaughtered animals or parts thereof.

54. The device of claim 53, wherein the processing device comprises at least one frictional surface which is arranged along the at least one slot and is designed to act on part of the slaughtered animals or parts thereof.

55. The device of claim 54, wherein the functional surface forms part of a driven conveyor belt.

56. The device of claim 55, wherein the processing device comprises two driven conveyor belts which are arranged on either side of the at least one slot, for clamping a part of the slaughtered animals or parts thereof between them.

57. The device of claim 55, wherein the processing device comprises at least two driven conveyor belts which are arranged one behind the other along the at least one slot.

58. The device of claim 56, wherein the direction of movement of a first conveyor belt differs from that of a second conveyor belt.

59. A device for processing a slaughtered animal, the device having a first and a second station and further comprising:
   a. at least one substantially stationary slot which extends between the first station and the second station and comprises a width, a course, a supply end, a discharge end, a first opening at the supply end of the at least one slot and a second opening at the discharge end of the at least one slot, wherein the at least one slot is designed to carry and support the slaughtered animal;
   b. supply means for supplying at the first station the slaughtered animal to the at least one slot;
   c. at least one driving member which passes through a path which is substantially parallel to the course of the at least one slot and is designed to move the slaughtered animal which is supplied to the at least one slot along the at least one slot from the first station towards the second station, wherein the at least one driving member scans at least half the width of the at least one slot; and
   d. discharge means for discharging the slaughtered animal from the at least one slot, wherein the discharge means are located between the first station and the second station, and wherein the discharge means are controllable, allowing the discharge means to controllably adopt a first position wherein the slaughtered animal is conveyed along the at least one slot toward the second station, and allowing the discharge means to controllably adopt a second position wherein the slaughtered animal is removed from the at least one slot.

60. A device for processing a slaughtered animal part, the device having a first and a second station and fiber comprising:
   a. at least one substantially stationary slot which extends between the first station and the second station and comprises a width, a course, a supply end, a discharge end, a first opening at the supply end of the at least one slot and a second opening at the discharge end of the at least one slot, wherein the at least one slot is designed to carry and support the slaughtered animal part;
   b. supply means for supplying at the first station the slaughtered animal part to the at least one slot;
   c. at least one driving member which passes through a path which is substantially parallel to the course of the at least one slot and is designed to move the slaughtered animal part which is supplied to the at least one slot along the at least one slot from the first station towards the second station, wherein the at least one driving member spans at least half the width of the at least one slot; and
   d. discharge means for discharging the slaughtered animal part from the at least one slot, wherein the discharge means are located between the first station and the second station, and wherein the discharge means are controllable, allowing the discharge means to controllably adopt a first position wherein the slaughtered animal part is conveyed along the at least one slot toward the second station, and allowing the discharge means to controllably adopt a second position wherein the slaughtered animal part is removed from the at least one slot.

* * * * *